United States Patent
Kondo et al.

(10) Patent No.: US 10,571,780 B2
(45) Date of Patent: Feb. 25, 2020

(54) LENS UNIT, CAMERA SYSTEM, AND LENS MOUNT

(71) Applicant: FUJIFILM Corporation, Tokyo (JP)

(72) Inventors: Nobuyuki Kondo, Saitama (JP); Kentaro Tokiwa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/352,849

(22) Filed: Mar. 14, 2019

(65) Prior Publication Data
US 2019/0212634 A1 Jul. 11, 2019

Related U.S. Application Data

(63) Continuation of application No. PCT/JP2017/032435, filed on Sep. 8, 2017.

(30) Foreign Application Priority Data

Sep. 16, 2016 (JP) .................................. 2016-182017
Dec. 13, 2016 (JP) .................................. 2016-241124

(51) Int. Cl.
G03B 17/14 (2006.01)
H04N 5/225 (2006.01)
G02B 7/14 (2006.01)

(52) U.S. Cl.
CPC ............... *G03B 17/14* (2013.01); *G02B 7/14* (2013.01); *H04N 5/2254* (2013.01); *H04N 5/2257* (2013.01)

(58) Field of Classification Search
None
See application file for complete search history.

(56) References Cited

U.S. PATENT DOCUMENTS 2,780,137 A * 2/1957 Bourgeois ................ G03B 3/02
                                                                                    359/828
3,758,198 A * 9/1973 Kanie ..................... G03B 17/12
                                                                                    359/828
(Continued)

FOREIGN PATENT DOCUMENTS

JP S47037934 12/1972
JP S55046733 4/1980
(Continued)

OTHER PUBLICATIONS

"International Search Report (Form PCT/ISA/210) of PCT/JP2017/032435," dated Dec. 12, 2017, with English translation thereof, pp. 1-5.

(Continued)

Primary Examiner — William B Perkey
(74) Attorney, Agent, or Firm — JCIPRNET

(57) ABSTRACT

A lens unit includes an optical system that includes at least one lens, a lens barrel that receives the optical system, and a lens mount that is provided on one end side of the lens barrel and is fastened to a body mount provided on a camera. The lens mount includes a reference surface that is in contact with the body mount; a cylindrical portion that extends to the body mount from the reference surface; a plurality of bayonet claws that are provided in a circumferential direction of the cylindrical portion and extend outward in a radial direction; a plurality of bayonet grooves that are defined by the reference surface, the cylindrical portion, and the plurality of bayonet claws and are engaged with body claws of the body mount; and an elastic member that is provided in at least one bayonet groove of the plurality of bayonet grooves, includes a contact surface to be in contact with the body claw, is provided in a rotational direction of the body (Continued)

claw, and applies a biasing force to the body claw in the radial direction.

25 Claims, 25 Drawing Sheets

(56) References Cited

U.S. PATENT DOCUMENTS

| | | | | |
|---|---|---|---|---|
| 4,302,077 | A * | 11/1981 | Sato | G03B 17/14 |
| | | | | 359/828 |
| 4,659,203 | A * | 4/1987 | Niwa | G03B 17/14 |
| | | | | 359/828 |
| 6,270,266 | B1 * | 8/2001 | Fukuda | G03B 17/14 |
| | | | | 396/529 |
| 6,967,794 | B2 * | 11/2005 | Luthardt | G02B 7/14 |
| | | | | 359/399 |
| 8,770,868 | B1 * | 7/2014 | Hasuda | G03B 17/14 |
| | | | | 396/531 |
| 2005/0212949 | A1 * | 9/2005 | Tokiwa | G03B 17/14 |
| | | | | 348/340 |
| 2008/0292306 | A1 * | 11/2008 | Watanabe | G03B 17/14 |
| | | | | 396/448 |
| 2019/0271826 | A1 * | 9/2019 | Kondo | G02B 7/14 |

FOREIGN PATENT DOCUMENTS

| | | |
|---|---|---|
| JP | S55108433 | 7/1980 |
| JP | S55147620 | 11/1980 |
| JP | S61032018 | 2/1989 |
| JP | H07114088 | 5/1995 |
| JP | 2000155272 | 6/2000 |
| JP | 2003015010 | 1/2003 |
| JP | 2004102005 | 4/2004 |
| JP | 2009300926 | 12/2009 |
| JP | 2010186085 | 8/2010 |

OTHER PUBLICATIONS

"International Preliminary Report on Patentability (Form PCT/IPEA/ 409) of PCT/JP2017/032435," completed on Dec. 5, 2018, with English translation thereof, pp. 1-9.

Office Action of Japan Counterpart Application, with English translation thereof, dated May 28, 2019, pp. 1-6.

* cited by examiner

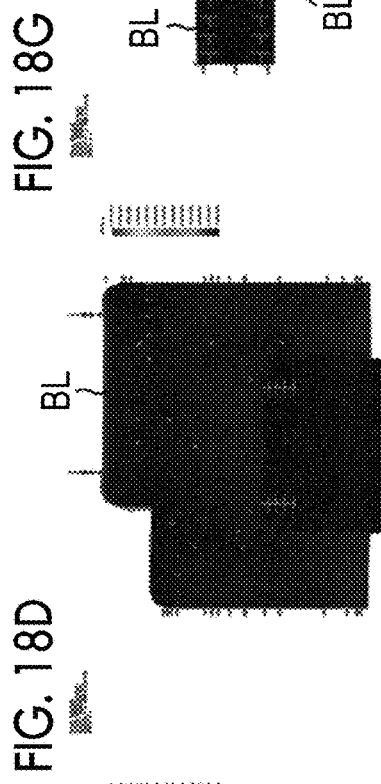
FIG. 18A
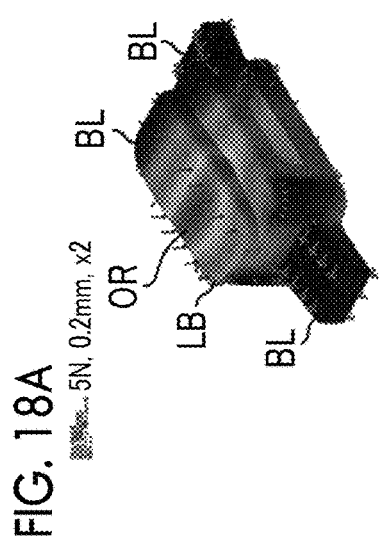
FIG. 18B
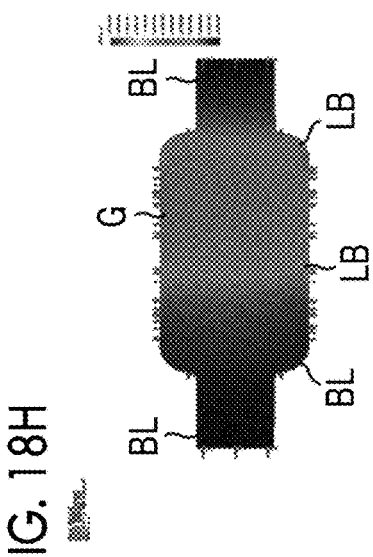
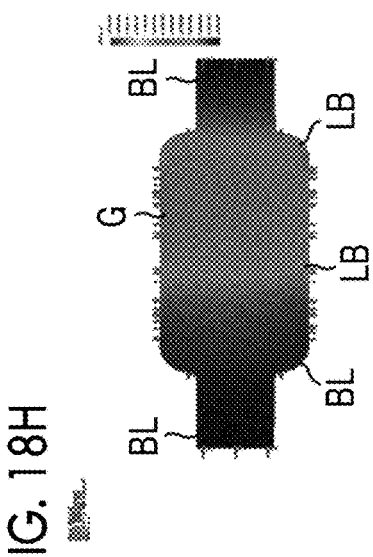
FIG. 18C
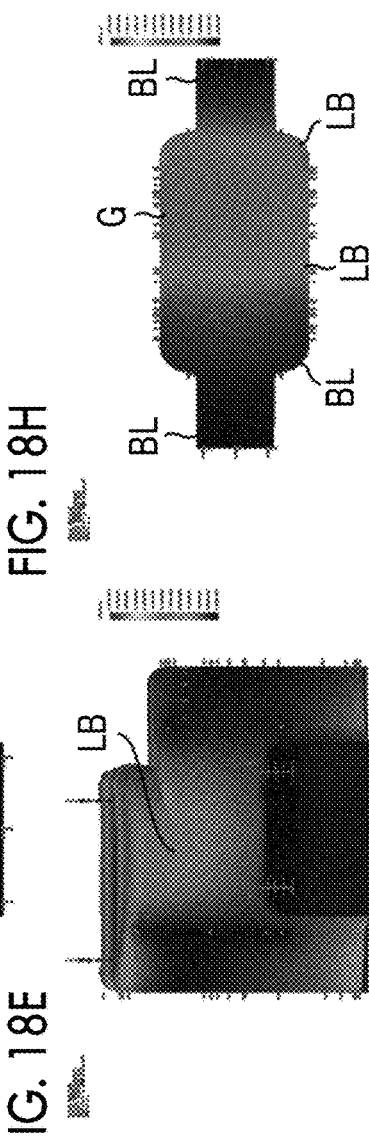
FIG. 18D
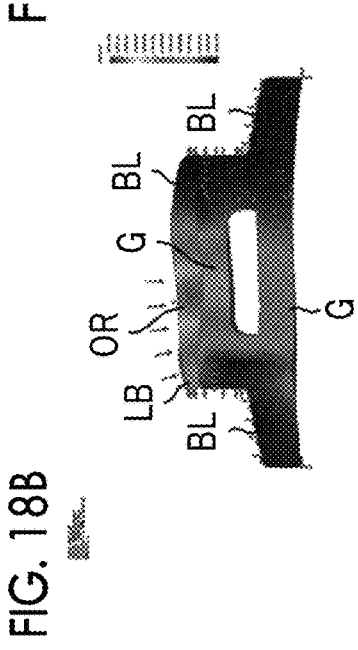
FIG. 18E
FIG. 18F
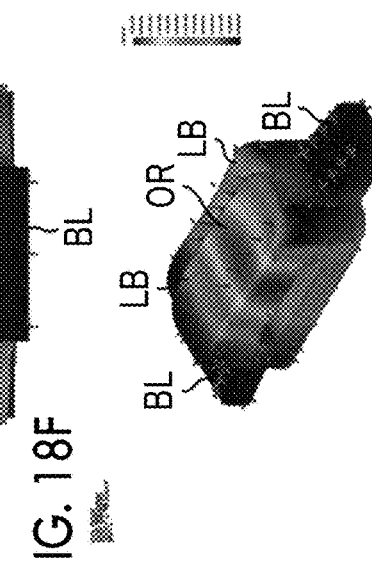
FIG. 18G
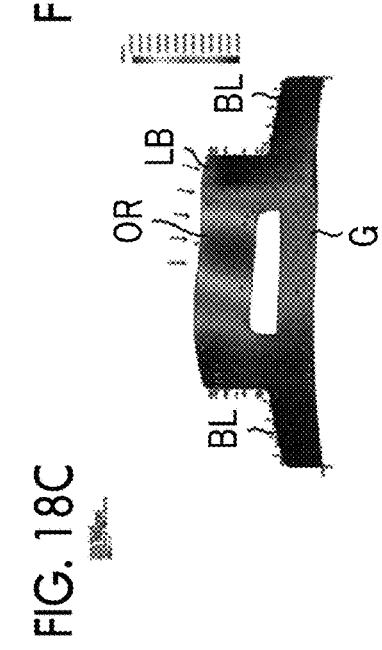
FIG. 18H

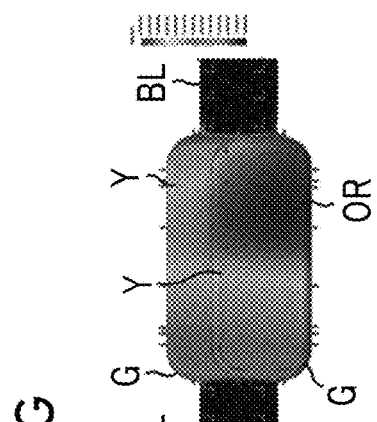
FIG. 28A
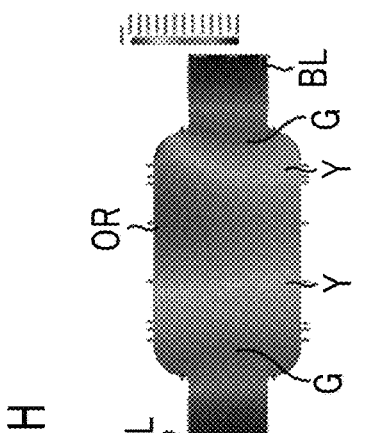
FIG. 28B
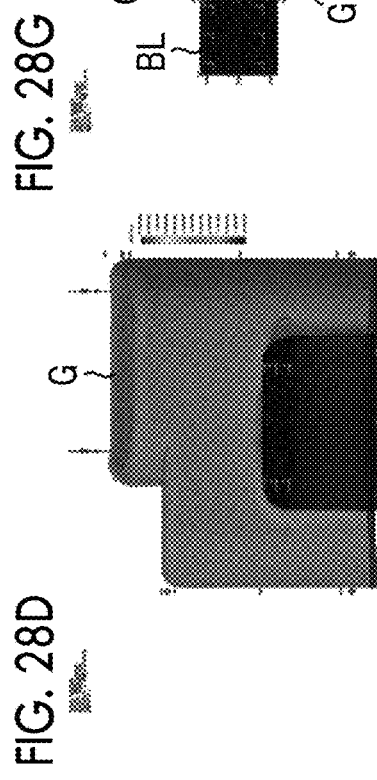
FIG. 28D
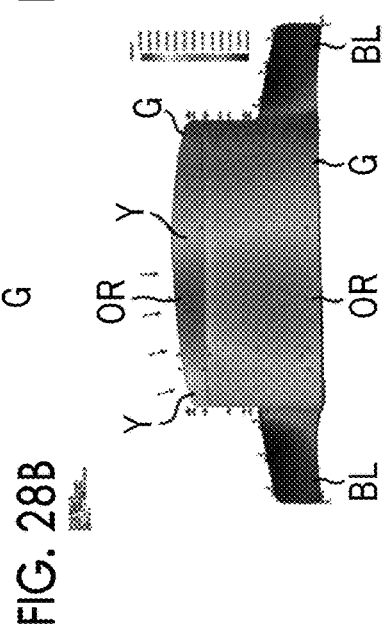
FIG. 28E
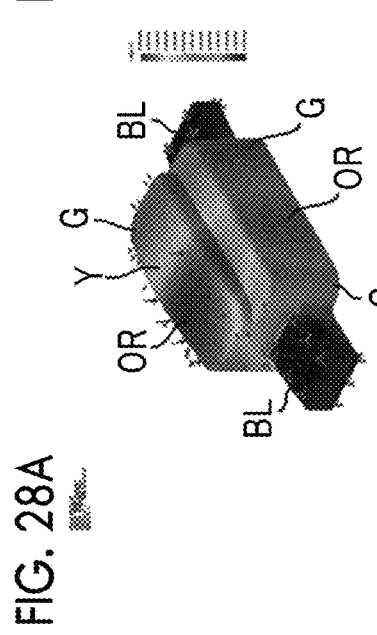
FIG. 28C
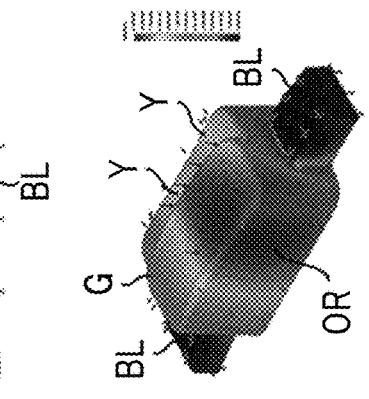
FIG. 28G
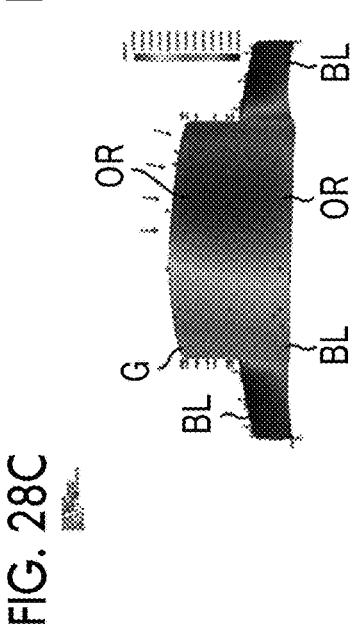
FIG. 28F
FIG. 28H

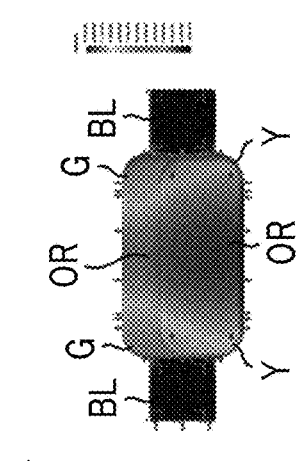
FIG. 29A
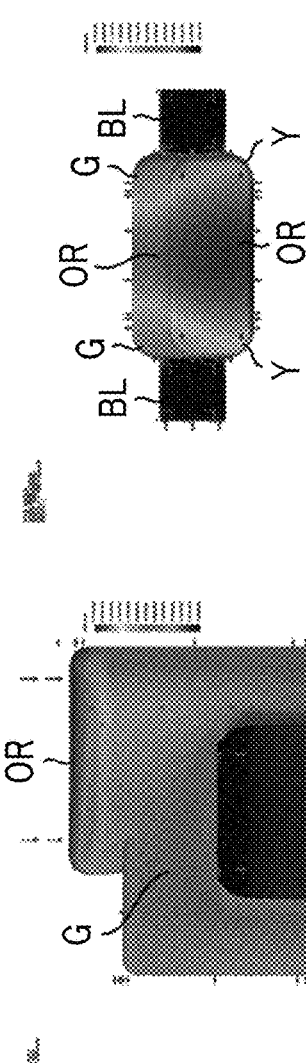
FIG. 29B
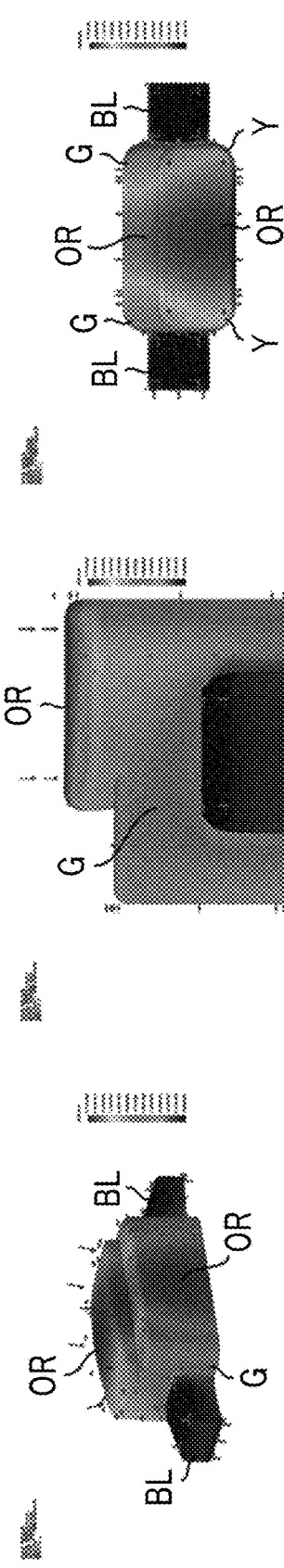
FIG. 29C
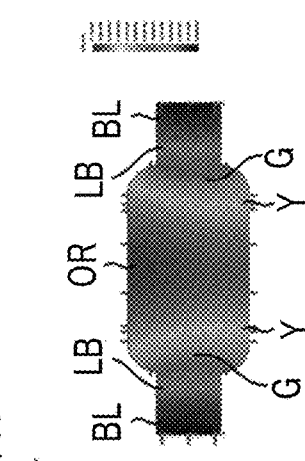
FIG. 29D
FIG. 29E
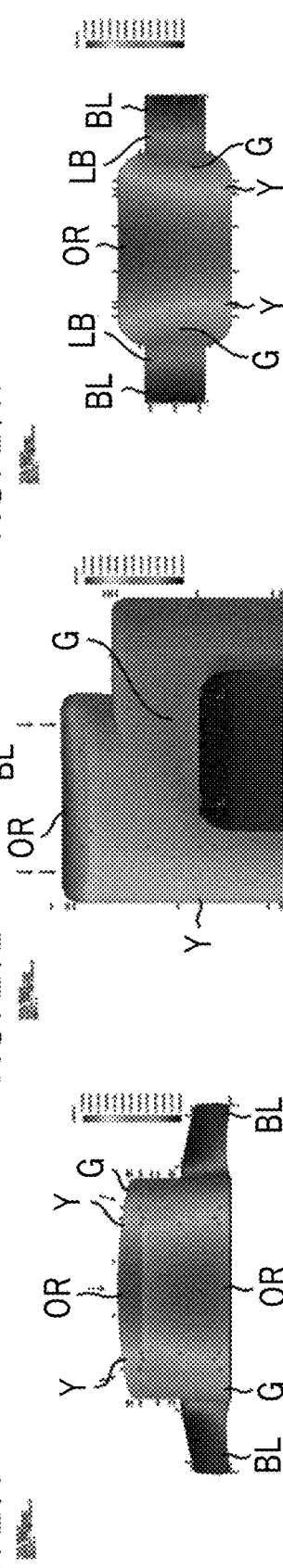
FIG. 29F
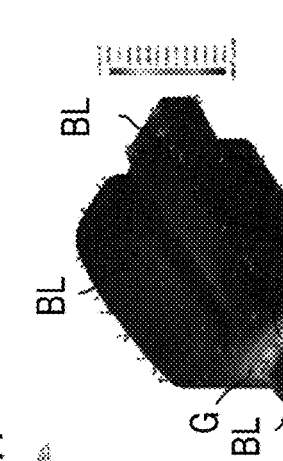
FIG. 29G
FIG. 29H
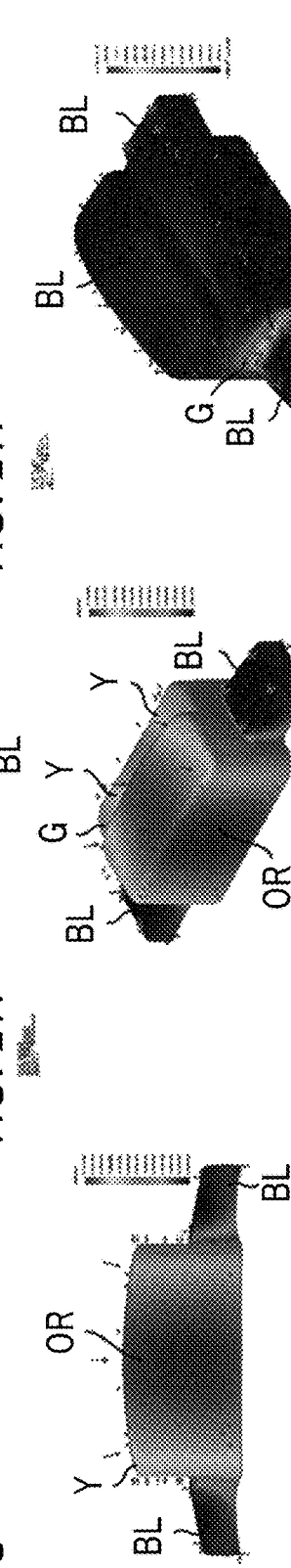
FIG. 29I

LENS UNIT, CAMERA SYSTEM, AND LENS MOUNT

CROSS-REFERENCE TO RELATED APPLICATIONS

The present application is a Continuation of PCT International Application No. PCT/JP2017/032435 filed on Sep. 8, 2017 claiming priorities under 35 U.S.C § 119(a) to Japanese Patent Application No. 2016-182017 filed on Sep. 16, 2016 and Japanese Patent Application No. 2016-241124 filed on Dec. 13, 2016. Each of the above applications is hereby expressly incorporated by reference, in their entirety, into the present application.

BACKGROUND OF THE INVENTION

1. Field of the Invention

The present invention relates to a lens unit that is mounted in a bayonet manner, a camera system, and a lens mount.

2. Description of the Related Art

In the related art, a structure where a lens unit is mounted on a camera body in a bayonet manner has been widely employed in a camera that is used while a lens unit is interchanged. For example, JP1980-0147620A (JP-S55-0147620A) discloses a structure that biases a lens unit in the direction of an optical axis and a radial direction by a spring member to absorb backlash occurring in the direction of the optical axis and the radial direction in a case where the lens unit is mounted on a camera body in a bayonet manner.

SUMMARY OF THE INVENTION

Generally, the mounting of the lens unit on the camera body and an operation of a zoom ring and the like relative to the lens unit after the mounting are performed by an operator's manual operation. Accordingly, a biasing force, which is applied in the radial direction by the spring member, is perceived as operator's feeling (referred to as click feeling) or sound at the time of mounting of the lens unit and the time of operation of the lens unit.

In JP1980-147620A (JP-S55-147620A), the mounting position of the spring member, which biases the lens unit in the radial direction, is not examined and there is a concern that discomfort may be given to an operator as feeling or sound at the time of mounting of the lens unit and the time of operation of the lens unit.

The invention has been made in consideration of the above-mentioned circumstances, and an object of the invention is to provide a lens unit, a camera system, and a lens mount that can improve feeling and sound to be given to an operator at the time of mounting of the lens unit and the time of operation of the lens unit.

A lens unit of a first aspect comprises an optical system that includes at least one lens, a lens barrel that receives the optical system, and a lens mount that is provided on one end side of the lens barrel and is mounted on a body mount provided on a camera. The lens mount includes: a reference surface that is in contact with the body mount; a cylindrical portion that extends to the body mount from the reference surface; a plurality of bayonet claws that are provided in a circumferential direction of the cylindrical portion and extend outward in a radial direction; a plurality of bayonet grooves that are defined by the reference surface, the cylindrical portion, and the plurality of bayonet claws and are engaged with body claws of the body mount; and an elastic member that is provided in at least one bayonet groove of the plurality of bayonet grooves, includes a contact surface to be in contact with the body claw, is provided in a rotational direction of the body claw, and applies a biasing force to the body claw in the radial direction.

In a lens unit of a second aspect, the elastic member is disposed at a position where the elastic member is in contact with the body claw at a stop position of the body claw.

In a lens unit of a third aspect, the elastic member is a molded member and is adapted to generate an elastic force by the entire elastic member.

In a lens unit of a fourth aspect, the elastic member is disposed at a front end position of the body claw in a travel direction at the stop position of the body claw.

In a lens unit of a fifth aspect, the body claw includes a notched portion that is provided between front and rear ends of the body claw in a travel direction and is spaced away from the elastic member, and the elastic member is disposed at a rear end position of the body claw in the travel direction at the stop position of the body claw.

In a lens unit of a sixth aspect, the elastic member is provided in each of the plurality of bayonet grooves.

In a lens unit of a seventh aspect, the cylindrical portion includes a through-hole, and the elastic member protrudes from an inner peripheral side of the cylindrical portion through the through-hole.

In an eighth aspect, the lens unit further comprises a mount cover that is fixed to the inner peripheral side of the cylindrical portion, includes a peripheral portion, and is supported by the peripheral portion. The mount cover supports the elastic members from the inner peripheral side.

In a lens unit of a ninth aspect, the elastic member has a hollow structure.

In a lens unit of a tenth aspect, a surface of the elastic member opposite to the contact surface has the shape of an arc protruding toward the contact surface.

In a lens unit of an eleventh aspect, the contact surface of the elastic member has the shape of an arc protruding toward the body claw.

In a lens unit of a twelfth aspect, the contact surface includes a region that is not in contact with the body claw.

In a lens unit of a thirteenth aspect, the contact surface has a curvature larger than the inner diameter of the body claw.

In a lens unit of a fourteenth aspect, a front end of the body claw in a travel direction has a rounded shape, and a front end of the contact surface of the elastic member in the travel direction has a rounded shape.

In a lens unit of a fifteenth aspect, a contact angle between the body claw and the elastic member is set to an angle that allows the body claw to ride on the contact surface after the body claw and the elastic member are in contact with each other.

In a lens unit of a sixteenth aspect, the elastic member includes a stepped portion that is provided in a direction of an optical axis on the contact surface to be in contact with the body claw.

In a lens unit of a seventeenth aspect, the stepped portion is provided closer to a front side than an end face of the body claw, which is close to the camera, in a cross section taken in a direction orthogonal to the optical axis of the optical system.

In an eighteenth aspect, the lens unit further includes an annular elastic member that is mounted on the lens mount and includes a protruding portion positioned on one end side of the annular elastic member and protruding toward an inner peripheral side.

In a lens unit of a nineteenth aspect, the annular elastic member includes a dent that is positioned on an outer peripheral side opposite to the protruding portion so as to be closer to the other end side of the annular elastic member than the protruding portion.

A camera system of a twentieth aspect includes the above-mentioned lens unit and a camera body that includes a body mount including the body claws to be engaged with the bayonet claws of the lens unit.

A lens mount of a twenty first aspect includes: a reference surface that is in contact with a body mount provided on a camera; a cylindrical portion that extends to the body mount from the reference surface; a plurality of bayonet claws that are provided in a circumferential direction of the cylindrical portion and extend outward in a radial direction; a plurality of bayonet grooves that are defined by the reference surface, the cylindrical portion, and the plurality of bayonet claws and are engaged with body claws of the body mount; and an elastic member that is provided in at least one bayonet groove of the plurality of bayonet grooves, includes a contact surface to be in contact with the body claw, is provided in a rotational direction of the body claw, and applies a biasing force to the body claw in the radial direction.

According to the invention, it is possible to improve feeling and sound to be given to an operator at the time of mounting of a lens unit and the time of operation of the lens unit, and to prevent an annular elastic member from being entangled.

BRIEF DESCRIPTION OF THE DRAWINGS

FIGS. 18A to 18H are diagrams showing the distribution of displacement of the elastic member of the first aspect.

FIGS. 24A to 24H are diagrams showing the distribution of stress of the elastic member of the second aspect.

FIGS. 28A to 28H are diagrams showing the distribution of displacement of the elastic member of the third aspect.

FIGS. 29A to 29I are diagrams showing the distribution of stress of the elastic member of the third aspect.

DESCRIPTION OF THE PREFERRED EMBODIMENTS

Preferred embodiments of the invention will be described below with reference to accompanying drawings. The invention will be described using the following preferred embodiments.

The invention can be modified by various methods without departing from the scope of the invention, and embodiments other than the embodiments can be used. Accordingly, all modifications within the scope of the invention are included in the claims.

First Embodiment

Figure 1:
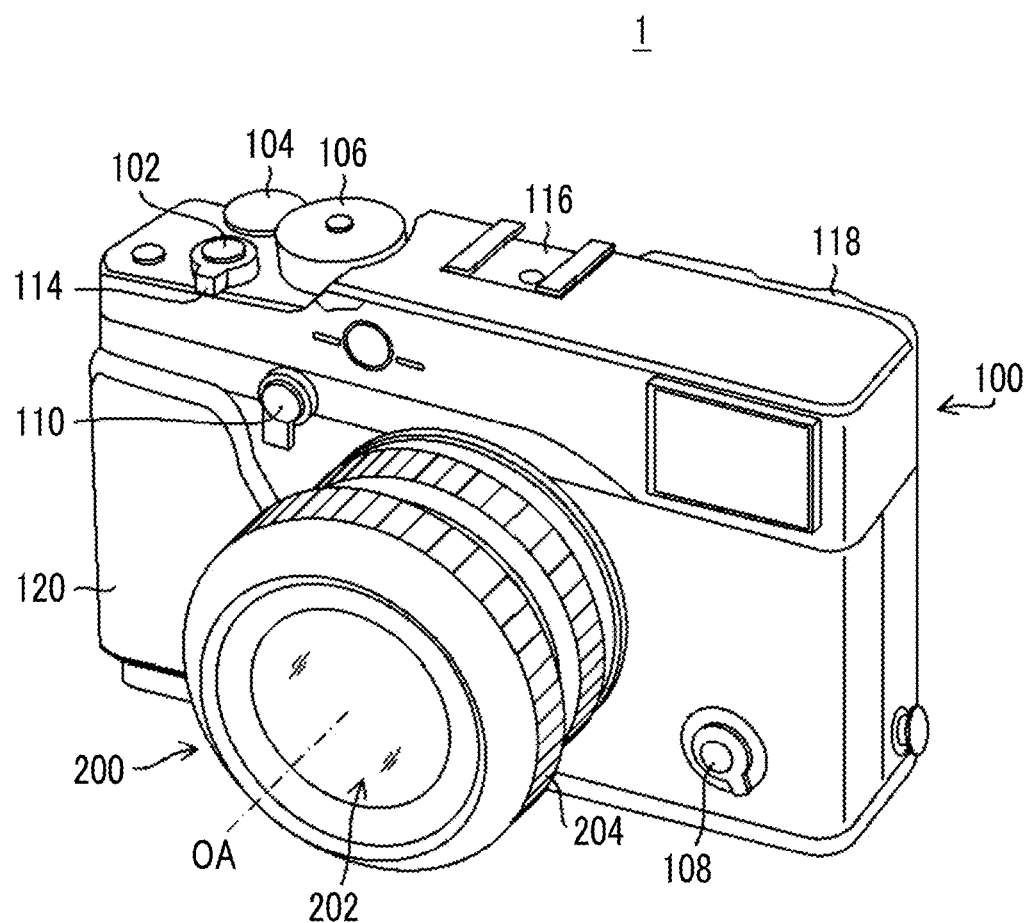
FIG. 1 is a perspective view showing the appearance of a camera system in a state where a lens unit is mounted on a camera body.
Figure 2:
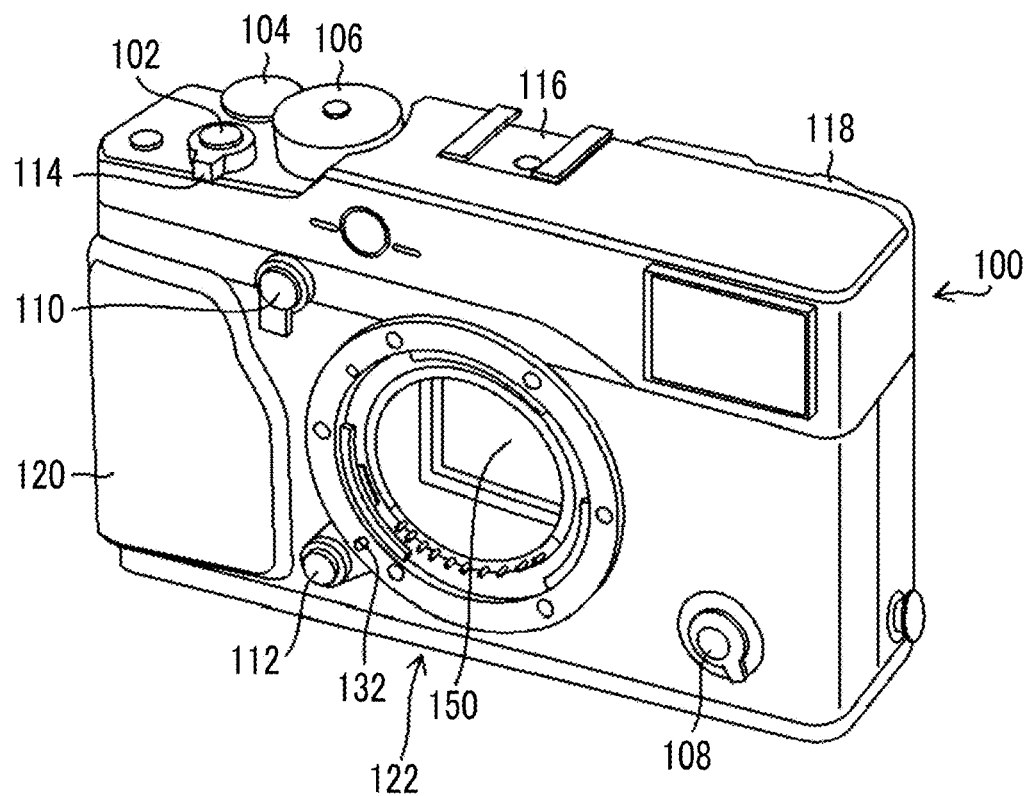
FIG. 2 is a perspective view showing the appearance of the camera body.
Figure 3:
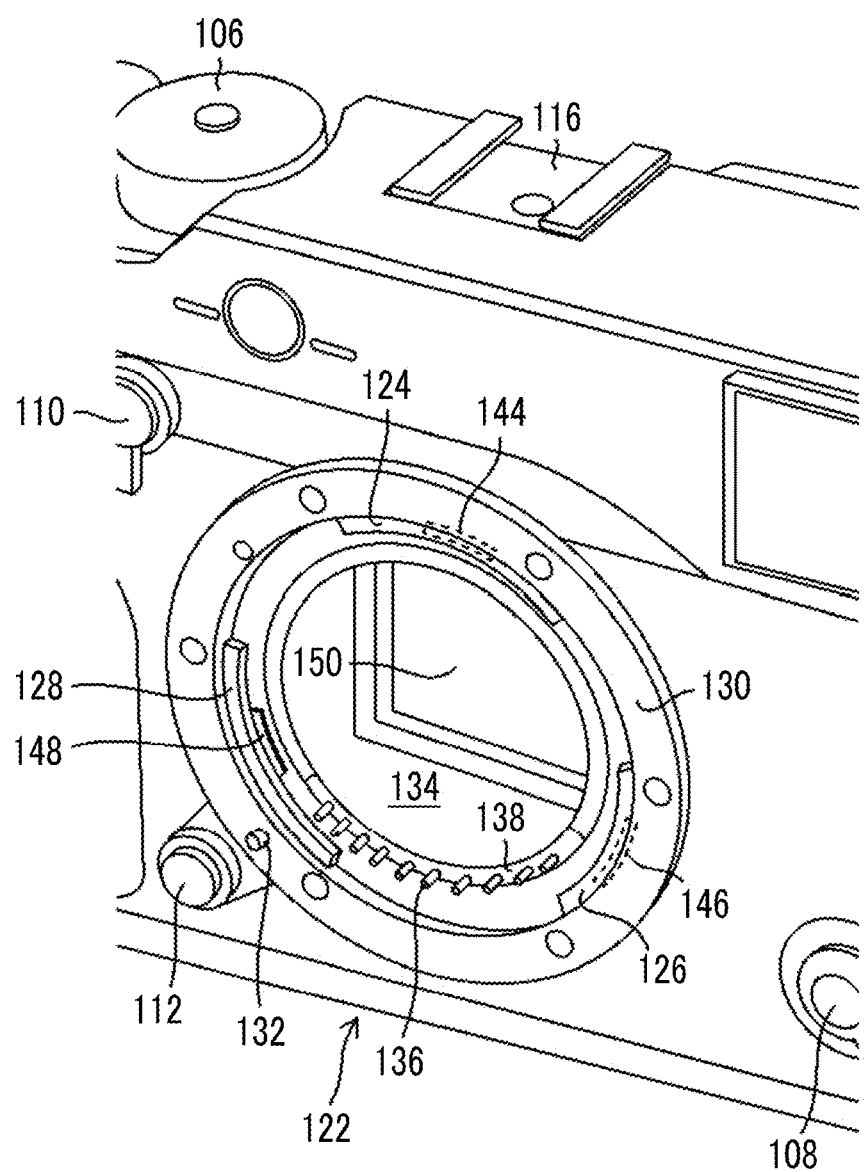
FIG. 3 is an enlarged view of a body mount.
Figure 4:
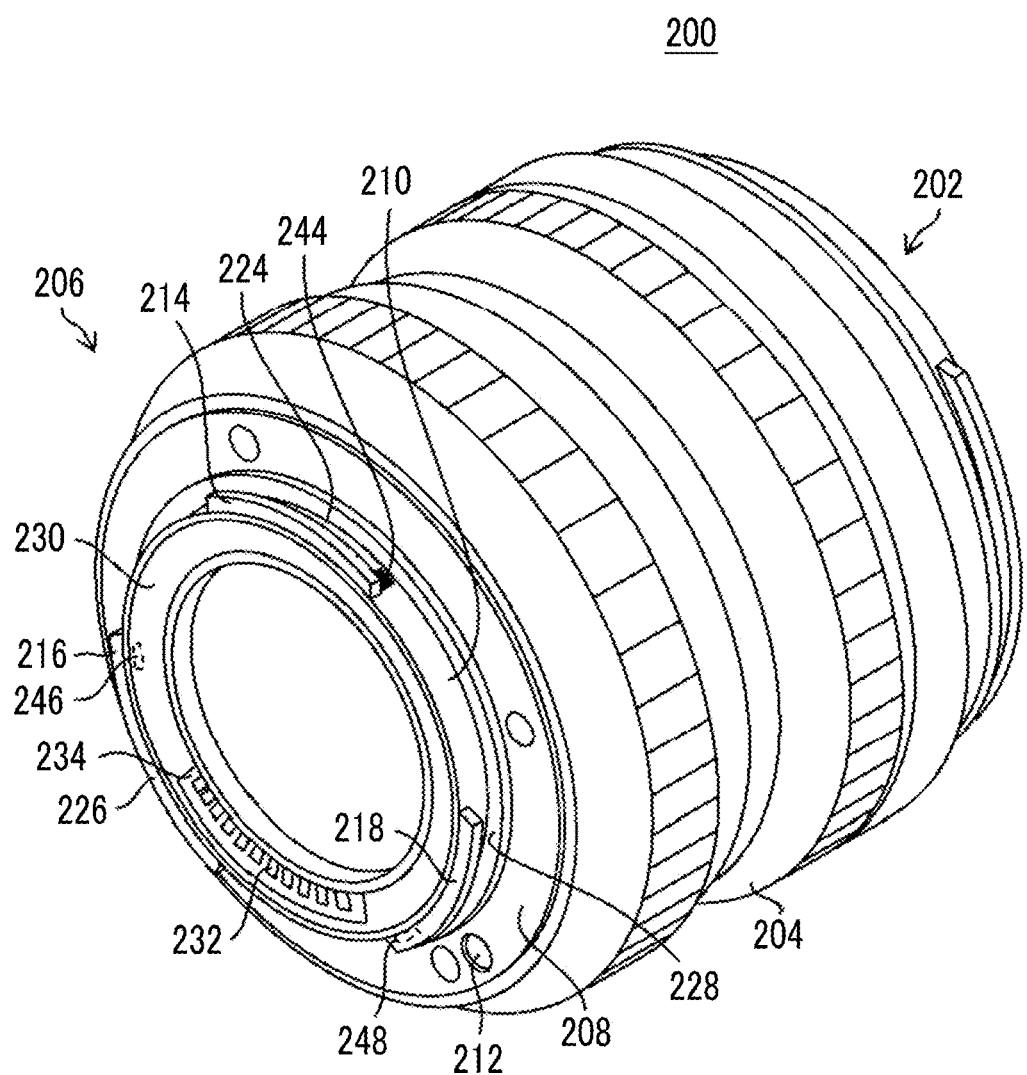
FIG. 4 is a perspective view showing the appearance of the lens unit.
Figure 5:
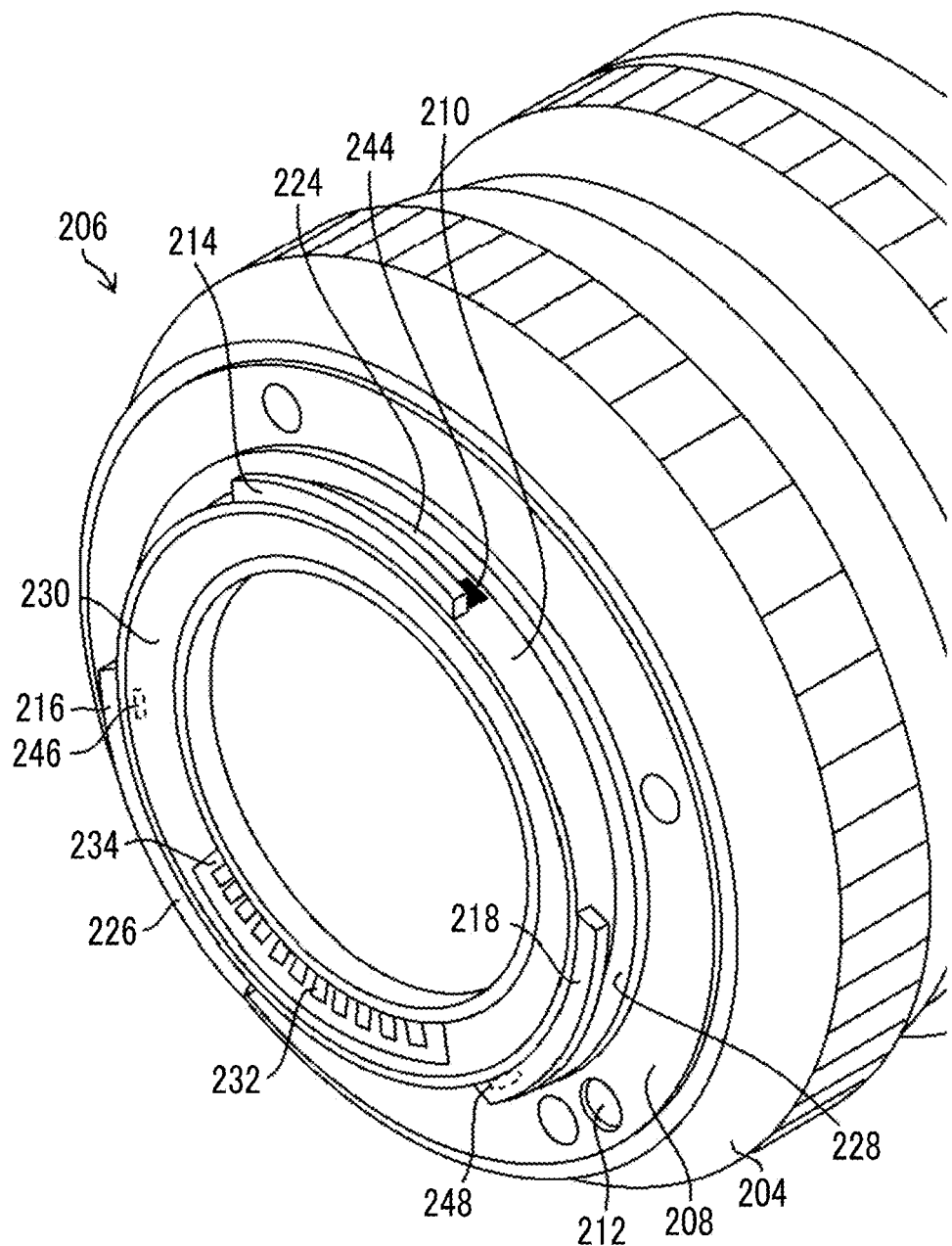
FIG. 5 is an enlarged view of a lens mount.

A lens unit of a first embodiment will be described with reference to the drawings. FIG. 1 is a perspective view showing the appearance of a camera system in which a lens unit is mounted on a camera body, and FIG. 2 is a perspective view showing the appearance of the camera body. FIG. 3 is an enlarged view of a body mount. FIG. 4 is a perspective view showing the appearance of the lens unit. FIG. 5 is an enlarged view of a lens mount.

In this specification, a direction along an optical axis OA (a Z direction in FIGS. 1 and 2) is referred to as a front-rear direction and a subject side is referred to as a front side. Further, in a plane orthogonal to the optical axis OA, a direction (an X direction in FIGS. 1 and 2) along a long side of an image sensor 150 (see FIG. 2) is referred to as a lateral direction or a left-right direction and a direction (a Y direction in FIGS. 1 and 2) along a short side of the image sensor 150 is referred to as a vertical direction or an up-down direction.

As shown in FIG. 1, the camera system 1 includes a camera body 100 and a lens unit 200. The camera system 1 of this embodiment is a lens-interchangeable camera system 1, and the lens unit 200 is attachably and detachably mounted on the camera body 100.

As shown in FIGS. 1 and 2, the camera body 100 has the shape of a rectangular box of which the thickness in the front-rear direction is smaller than the height in the up-down direction. The camera body 100 comprises a shutter button 102, an exposure correction dial 104, a shutter speed dial 106, a focus mode switching lever 108, a finder switching lever 110, a lens attachment/detachment button 112, a power lever 114, and the like as operation members. The shutter button 102, the exposure correction dial 104, and the shutter speed dial 106 are disposed on the upper side of the camera body 100.

The camera body 100 comprises a hot shoe 116, an electronic view finder 118, a grip 120, and a body mount 122. The grip 120 is disposed on the left side of the camera body 100. A user performs a release operation while gripping the grip 120.

The body mount 122 is a mounting portion on which the lens unit 200 is to be mounted. The body mount 122 has a bayonet structure.

As shown in FIG. 1, the lens unit 200 includes an optical system 202 that includes at least one lens and a lens barrel 204 that receives the optical system 202. The optical system 202 including lenses means an assembly of optical members that are used to form the image of an object by allowing the lenses to transmit light.

The lens barrel 204 is a substantially cylindrical body that can receive the optical system 202, and the shape of the lens barrel 204 is not limited as long as the lens barrel 204 can receive the optical system 202. Further, the lens barrel 204 can comprise, for example, a focus ring, a stop ring, and the like, and can form an appropriate image by the adjustment of the focus ring, the stop ring, and the like.

As shown in FIG. 2, the image sensor 150, which is exposed from the body mount 122, is disposed in the camera body 100. The image sensor 150 converts the image of a subject, which is formed by the optical system 202 of the lens unit 200, into electrical signals and outputs the electrical signals. A publicly known image sensor, such as a charge coupled device (CCD) image sensor or a complementary metal oxide semiconductor (CMOS) image sensor, is used as the image sensor 150.

FIG. 3 is an enlarged view of the body mount 122 provided on a camera. Three body claws 124, 126, and 128 are disposed on the body mount 122 at intervals to mount a lens mount 206 (see FIG. 4) to be described later on the body mount 122. The body mount 122 may include at least one body claw. The size of the interval between the body claws 124, 126, and 128 is set to a size that can allow each of bayonet claws 214, 216, and 218 of the lens mount 206 to pass.

In this embodiment, a body mount ring 130 including an opening 134 is disposed on the front side of the camera body 100. The three body claws 124, 126, and 128 are formed so as to protrude inward from the body mount ring 130 in the radial direction of the opening 134. The inner peripheral portions of the three body claws 124, 126, and 128 substantially have the shape of an arc. The front surface of the body mount ring 130 functions as a body mount-reference surface of the camera body 100.

It is preferable that the body mount ring 130 and the body claws 124, 126, and 128 are integrated with each other. The body mount ring 130 and the body claws 124, 126, and 128 can be formed integrally with each other by, for example, pressing or the like. During the pressing, pressing is preferably performed on the body mount ring 130 in a direction toward the rear side from the front side. Since the direction of the pressing is set the direction toward the rear side from the front side, the front surfaces of the body claws 124, 126, and 128 can be formed of rounded surfaces. On the other hand, there is a case where the rear surfaces of the body claws 124, 126, and 128 are formed as edges from which burrs protrude rearward.

The lens attachment/detachment button 112 is disposed on the front side of the camera body 100. A locking pin 132, which can be moved in the front-rear direction in conjunction with an operation for pressing the lens attachment/detachment button 112, is disposed on the body mount ring 130. The lens attachment/detachment button 112 and the locking pin 132 are biased to the front side by biasing means (not shown). Accordingly, the locking pin 132 protrudes through a through-hole of the body mount ring 130 in a state where the lens attachment/detachment button 112 is not pressed. By the operation for pressing the lens attachment/detachment button 112, the locking pin 132 is moved to a position where the locking pin 132 is retracted inside the through-hole from a position where the locking pin 132 protrudes from the body mount ring 130.

A plurality of signal contacts 136 are arranged on a seat 138 of the body mount 122 along the inner periphery of the opening 134 of the body mount ring 130. Each of the signal contacts 136 is formed of, for example, a pin, is biased to the front side of the camera body 100 by biasing means (not shown), and protrudes forward from the seat 138. The signal contacts 136 can be adapted to be capable of being moved in the front-rear direction by biasing means.

Mount springs 144, 146, and 148 are arranged on the body mount 122 at positions corresponding to the rear sides of the body claws 124, 126, and 128, respectively. In a case where the lens unit 200 is mounted on the camera body 100, the mount springs 144, 146, and 148 bias the bayonet claws 214, 216, and 218 of the lens unit 200 to the rear side in the direction of the optical axis OA. The mount springs 144, 146, and 148 pull the lens unit 200 toward the camera body 100, and allow a lens mount-reference surface and the body mount-reference surface to be in contact with each other. The positions of the image sensor 150 of the camera body 100 and the optical system 202 of the lens unit 200 in the direction of the optical axis OA and an optical distance between the image sensor 150 and the optical system 202 are determined.

FIG. 4 is a perspective view showing the appearance of the lens unit 200 that is viewed from the side thereof to be mounted on the camera body 100, and FIG. 5 is an enlarged view of the lens mount. As shown in FIGS. 4 and 5, the lens mount 206 to be mounted on the body mount 122 is provided on one end side of the lens barrel 204 of the lens unit 200, that is, the rear side of the lens barrel 204. The lens mount 206 has a bayonet structure.

The lens mount 206 comprises a lens mount ring 208, a cylindrical portion 210 that extends rearward from the lens mount ring 208, and the three bayonet claws 214, 216, and 218 that are arranged in the circumferential direction of the cylindrical portion 210 and extend outward in the radial direction of the cylindrical portion 210.

The lens mount 206 is provided with the three bayonet claws 214, 216, and 218 in this embodiment, but is not limited thereto. For example, the number of the bayonet claws may be 2 or 4.

In this embodiment, the surface of the lens mount ring 208 exposed from the lens barrel 204 functions as a lens mount-reference surface. In a case where the lens unit 200 is mounted on the camera body 100, the lens mount-reference surface of the lens mount ring 208 and the body mount-reference surface of the body mount ring 130 are in contact with each other.

As shown in FIGS. 4 and 5, the bayonet claws 214, 216, and 218 are arranged at intervals. The size of the interval between the bayonet claws 214, 216, and 218 is set to a size that can allow each of the body claws 124, 126, and 128 of the body mount 122 to pass.

The lens mount-reference surface of the lens mount ring 208 is provided with a pin hole 212 into which the locking pin 132 of the camera body 100 is to be inserted.

Three bayonet grooves 224, 226, and 228 are defined by the lens mount-reference surface and the respective bayonet claws 214, 216, and 218 of the lens mount 206.

The lens mount 206 includes a mount cover 230 that is fixed to the inner peripheral side of the cylindrical portion 210. A plurality of signal contacts 232 are arranged on a seat 234 provided on the exposed surface that is provided on the rear side of the mount cover 230. In a case where the lens unit 200 is mounted on the camera body 100, the signal contacts 232 of the lens unit 200 and the signal contacts 136 of the camera body 100 are electrically connected to each other.

In this embodiment, elastic members 244, 246, and 248 are disposed in the bayonet grooves 224, 226, and 228, respectively. The elastic members 244, 246, and 248 are adapted to protrude outward from the outer peripheral surface of the cylindrical portion 210. The elastic members 244, 246, and 248 comprise contact surfaces that are to be in contact with the corresponding body claws 124, 126, and 128. Since the elastic members 244, 246, and 248 are provided, feeling and sound, which are generated in a case where the lens unit 200 is mounted on the camera body 100, can be improved. The three elastic members 244, 246, and 248 are described in this embodiment, but at least one elastic member may be provided.

The mounting of the lens unit 200 (not shown) on the camera body 100 (not shown) will be described with reference to FIGS. 6 to 8. The bayonet claws 214, 216, and 218 of the lens unit 200 are not shown to facilitate the understanding of the operations of the elastic members 244, 246, and 248 and the body claws 124, 126, and 128.

Figure 6:
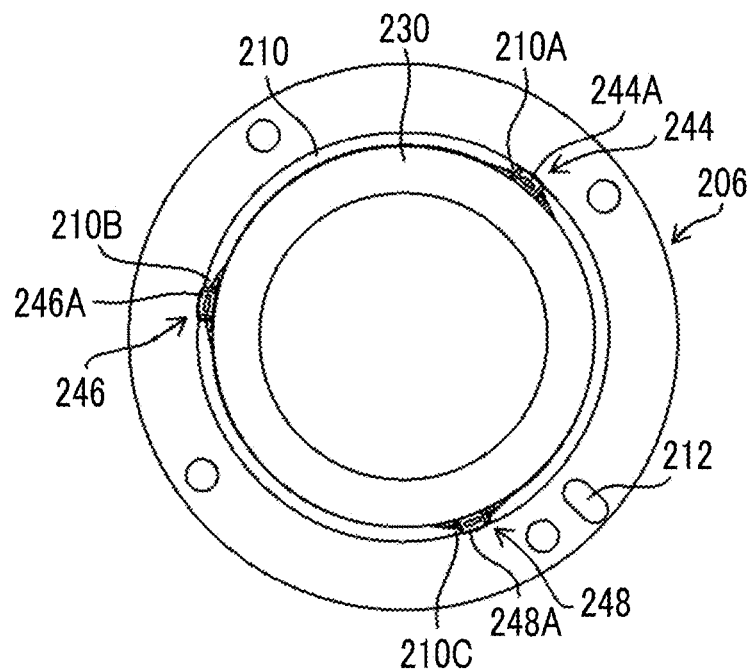
FIG. 6 is a diagram showing the lens mount from the rear side on an optical axis.

FIG. 6 is a diagram showing the lens mount 206 of the lens unit toward the front side from the rear side in the direction of the optical axis OA. The elastic members 244, 246, and 248 protrude from the inner peripheral side of the cylindrical portion 210 through through-holes 210A, 210B, and 210C. The elastic members 244, 246, and 248 include contact surfaces 244A, 246A, and 248A that are to be in contact with the body claws 124, 126, and 128 (not shown). Although the bayonet claws are not shown, the bayonet claws 214, 216, and 218 are arranged at positions corresponding to the elastic members 244, 246, and 248, respectively. Further, the positions corresponding to the bayonet claws 214, 216, and 218 are the positions of the bayonet grooves 224, 226, and 228 (not shown).

As shown in FIG. 6, the mount cover 230 includes a peripheral portion that supports the inner peripheral portion of the cylindrical portion 210. The mount cover 230 supports the elastic members 244, 246, and 248 from the inner peripheral side of the cylindrical portion 210. The separation of the elastic members 244, 246, and 248 from the inner peripheral side of the cylindrical portion 210 is prevented by the mount cover 230. As long as being capable of supporting the elastic members 244, 246, and 248, a portion of the mount cover 230, which supports the elastic members 244, 246, and 248, is not limited to the peripheral portion (the shape of an arc) and may be a linear portion or the like that has the same effect as the peripheral portion.

Figure 7:
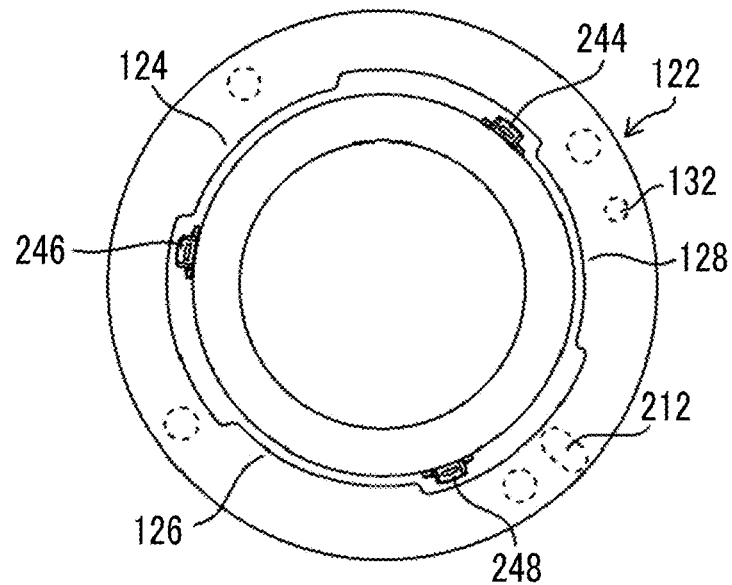
FIG. 7 is a diagram showing the states of the lens mount and the body mount, which do not yet reach a stop position, viewed from the rear side on the optical axis.

FIG. 7 is a diagram showing the lens mount 206 of the lens unit from the rear side in the direction of the optical axis OA. First, the bayonet claws 214, 216, and 218 (not shown) of the lens mount 206 and the body claws 124, 126, and 128 of the body mount 122 are positioned at positions where the bayonet claws and the body claws do not interfere with each other. The lens unit 200 is fitted to the camera body 100 in this state, and the lens mount-reference surface of the lens mount 206 and the body mount-reference surface of the body mount 122 are in contact with each other.

In a state where the lens mount-reference surface and the body mount-reference surface are in contact with each other, the lens unit and the camera body are rotated relative to each other. In a case where the lens mount 206 is rotated counterclockwise and the body mount 122 is rotated clockwise in FIG. 7, the body claws 124, 126, and 128 and the elastic members 244, 246, and 248 are moved relative to each other. The lens mount 206 is rotated counterclockwise in FIG. 7 to facilitate understanding. The lens unit 200 is rotated clockwise in a case where the lens unit is viewed toward the rear side from the front side in the direction of the optical axis OA.

The bayonet claws 214, 216, and 218 (not shown) are moved to the rear sides of the corresponding body claws 124, 126, and 128, that is, the body claws 124, 126, and 128 are moved to the corresponding bayonet grooves 224, 226, and 228. Accordingly, the body claws 124, 126, and 128 and the bayonet grooves 224, 226, and 228 start to overlap with each other in a case where the body claws 124, 126, and 128 and the bayonet grooves 224, 226, and 228 are viewed in the direction of the optical axis.

Figure 8:
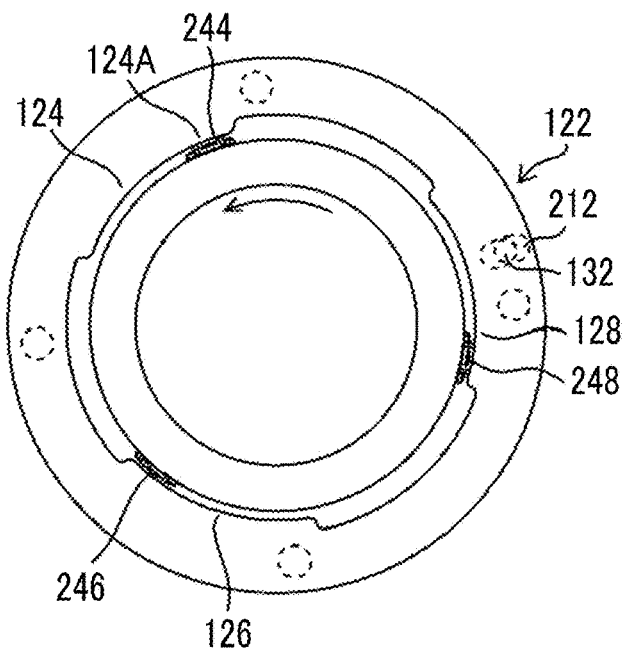
FIG. 8 is a diagram showing a state where the lens mount is mounted on the body mount at the stop position, viewed from the rear side on the optical axis.

After that, the locking pin 132 of the camera body 100 is inserted into the pin hole 212 of the lens unit 200 as shown in FIG. 8 in a case where the lens unit 200 and the camera body 100 are rotated relative to each other. The rotation of the lens unit 200 is locked. Accordingly, the rotation of the lens unit 200 is restricted, so that the separation of the lens unit 200 from the camera body 100 is prevented. Therefore, the lens unit 200 is mounted on the camera body 100. In this specification, a state where the locking pin 132 is inserted into the pin hole 212 is defined as a "stop position". Engagement between the body claws 124, 126, and 128 and the bayonet grooves 224, 226, and 228 means a state where the bayonet claws 214, 216, and 218 and the corresponding body claws 124, 126, and 128 overlap with each other in a case where the camera system 1 is viewed in the direction of the optical axis OA.

As shown in FIG. 8, the contact surfaces 244A, 246A, and 248A of the respective elastic members 244, 246, and 248 are in contact with the corresponding body claws 124, 126, and 128. The elastic members 244, 246, and 248 are elastically deformed in a case where the elastic members 244, 246, and 248 are in contact with the body claws 124, 126, and 128. As a result, the elastic members 244, 246, and 248 bias the corresponding body claws 124, 126, and 128 in the radial direction. The radial direction is a direction orthogonal to the optical axis OA, is a radial direction having a center on the optical axis OA, and is also referred to as a radial direction. Orthogonal includes orthogonal and substantially orthogonal, and the center includes a center and a substantial center.

As shown in FIG. 8, the elastic members 244, 246, and 248 are arranged at positions where the elastic members 244, 246, and 248 are in contact with the corresponding body claws 124, 126, and 128 at the stop position of the body claws 124, 126, and 128.

That is, in this embodiment, the elastic members 244, 246, and 248 are arranged at front end positions of the body claws 124, 126, and 128 in a travel direction (or a rotational direction) at the stop position of the body claws 124, 126, and 128.

The position of the elastic member will be described using the elastic member 244 and the body claw 124 by way of example. As shown in FIG. 7, the body claw 124 and the elastic member 244 are not in contact with each other since the body claw 124 is not yet rotated. In a case where the body claw 124 is used as a reference, the corresponding elastic member 244 is disposed on the downstream side in the travel direction of the body claw 124 that is to be rotated in a clockwise direction.

As shown in FIG. 8, at the stop position, the body claw 124 and the elastic member 244 are in contact with each other at the front end position 124A of the body claw 124. That is, this means that the body claw 124 and the elastic member 244 are not in contact with each other until the body claw 124 and the elastic member 244 reach the stop position.

The front end position 124A of the body claw 124 means the downstream side of the body claw 124 in the travel direction, and does not mean only the front end of the body claw 124.

As described above, the body claws 124, 126, and 128 and the elastic members 244, 246, and 248 start to be in contact with each other immediately before the lens unit 200 is completely mounted on the camera body 100. According to the lens unit 200 of this embodiment, since torque used to rotate the lens unit 200 can be made larger than that of a lens unit, which does not include the elastic members, by the biasing forces of the elastic members 244, 246, and 248, good feeling and sound can be given to an operator.

A position where the body claws 124, 126, and 128 and the elastic members 244, 246, and 248 start to be in contact with each other can be changed by a change in the positions of the elastic members 244, 246, and 248.

Further, backlash in the radial direction, which occurs between the lens unit 200 and the camera body 100, can be reduced by the elastic members 244, 246, and 248. Furthermore, sound caused by backlash in the radial direction can be reduced.

Since the elastic members 244, 246, and 248 bias the body claws 124, 126, and 128 in the radial direction even after the lens unit 200 is mounted on the camera body 100, good feeling and a reduction in sound can be achieved even during the operation of the lens unit 200.

In addition, feeling can be changed according to operator's preference by a change in the material of the elastic members 244, 246, and 248.

Next, the shape of the elastic member will be described with reference to the drawings. Here, the shapes of three kinds of elastic members will be described.

Figure 9:
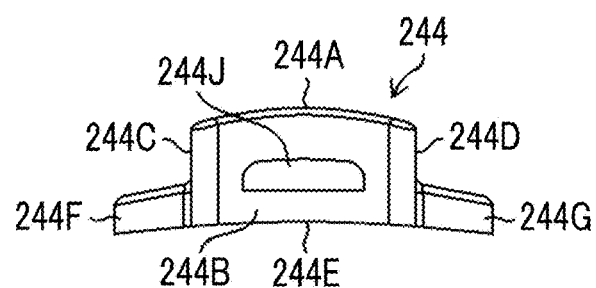
FIG. 9 is a front view of an elastic member of a first aspect.
Figure 10:
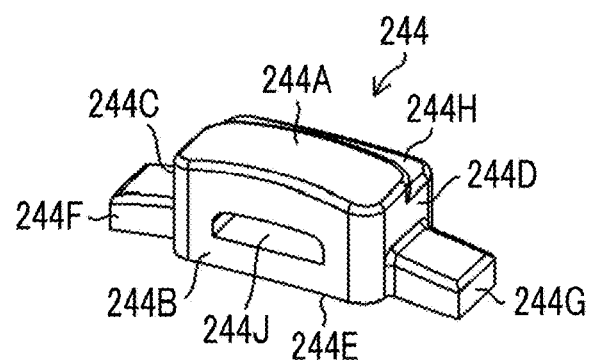
FIG. 10 is a perspective view of the elastic member of the first aspect.
Figure 11:
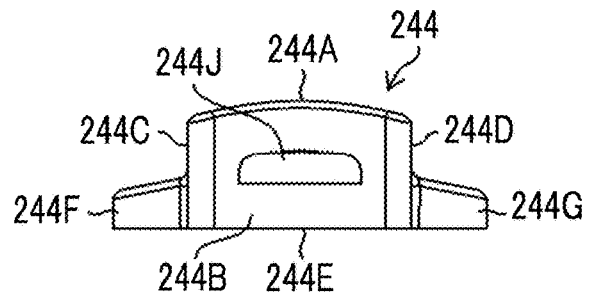
FIG. 11 is a front view of an elastic member of a second aspect.
Figure 12:
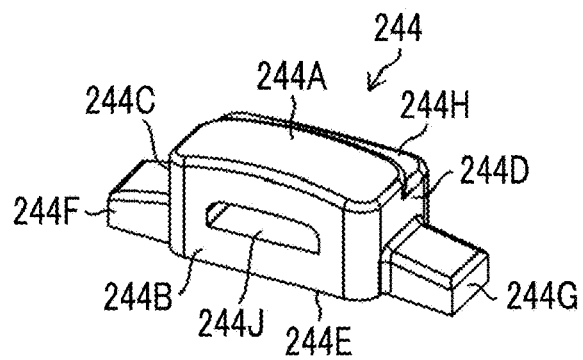
FIG. 12 is a perspective view of the elastic member of the second aspect.
Figure 13:
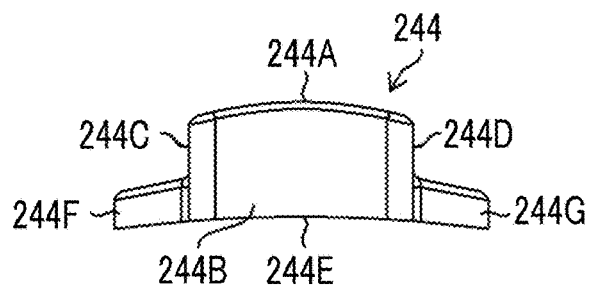
FIG. 13 is a front view of an elastic member of a third aspect.
Figure 14:
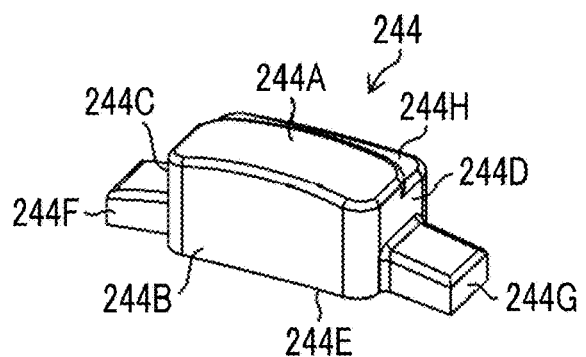
FIG. 14 is a perspective view of the elastic member of the third aspect.

FIG. 9 is a front view of an elastic member of a first aspect, FIG. 10 is a perspective view of the elastic member of the first aspect, FIG. 11 is a front view of an elastic member of a second aspect, FIG. 12 is a perspective view of the elastic member of the second aspect, FIG. 13 is a front view of an elastic member of a third aspect, and FIG. 14 is a perspective view of the elastic member of the third aspect. The shape of the elastic member will be described using the elastic member 244 by way of example.

As shown in FIGS. 9 and 10, the elastic member 244 of the first aspect comprises a body portion 244B that has the shape of a substantially rectangular parallelepiped as a whole. The body portion 244B comprises a contact surface 244A that is to be in contact with the body claw 124 (not shown). Protruding portions 244F and 244G, which continue from an opposite surface 244E opposite to the contact surface 244A, are provided on side surfaces 244C and 244D of the body portion 244B in a longitudinal direction, respectively. The opposite surface 244E means a surface faces the contact surface 244A.

The body portion 244B includes a stepped portion 244H that is adjacent to the contact surface 244A. The stepped portion 244H is formed at a position where the stepped portion 244H is not in contact with the body claw 124 (not shown).

The elastic member 244 of this aspect has a hollow structure where a hollow portion 244J is formed in the body portion 244B. The hollow portion 244J passes through the body portion 244B. In a front view, the side of the hollow portion 244J close to the contact surface 244A has the shape of an arc and the side of the hollow portion 244J close to the opposite surface 244E has a linear shape. Further, connecting portions between the sides of the hollow portion 244J close to the side surfaces 244C and 244D and the side of the hollow portion 244J close to the contact surface 244A have the shape of an arc. Furthermore, connecting portions between the sides of the hollow portion 244J close to the side surfaces 244C and 244D and the side of the hollow portion 244J close to the opposite surface 244E have the shape of a right angle. Here, the shape of an arc includes the shape of an arc and the shape of a substantial arc, the linear shape includes a line and a substantial line, and the shape of a right angle includes the shape of a right angle and the shape of a substantially right angle.

In the elastic member 244 of this aspect, the contact surface 244A has the shape of an arc that protrudes toward the body claw 124 (not shown). The shape of an arc includes the shape of an arc and the shape of a substantial arc. The shape of a substantial arc is a shape where a distance from the opposite surface 244E is increased toward the middle portion of the contact surface 244A from the side surfaces 244C and 244D. A shape toward the middle portion of the contact surface 244A from the side surfaces 244C and 244D may be a curved shape or a linear shape.

In the elastic member 244 of this aspect, the opposite surface 244E has the shape of an arc that protrudes toward the contact surface 244A. Further, the back surface (the surface opposite to the contact surface 244A) of the protruding portion 244F, the opposite surface 244E, and the back surface (the surface opposite to the contact surface 244A) of the protruding portion 244G are continuous. The shape of an arc is formed as a whole by the back surface of the protruding portion 244F, the opposite surface 244E, and the back surface of the protruding portion 244G A surface (back surface) where the opposite surface 244E and the protruding portions 244F and 244G are continuous is supported by the outer periphery of the mount cover 230 (see FIG. 6). It is preferable that the curvature of the arc-shaped back surface, which is formed by the opposite surface 244E and the protruding portions 244F and 244G is larger than the curvature of the outer periphery of the mount cover 230.

An elastic member of a second aspect will be described with reference to FIGS. 11 and 12. There is a case where the same components as those of the elastic member of the first aspect shown in FIGS. 9 and 10 are denoted by the same reference numerals as those of the elastic member of the first aspect and the description thereof are omitted. The elastic member 244 of the second aspect comprises a body portion 244B that has the shape of a substantially rectangular parallelepiped as a whole. The body portion 244B comprises a contact surface 244A, side surfaces 244C and 244D, protruding portions 244F and 244G that continue from an opposite surface 244E, a stepped portion 244H that is adjacent to the contact surface 244A, and a hollow portion 244J.

The elastic member 244 of the second aspect and the elastic member 244 of the first aspect are different from each other in terms of the shape of the back surface of the elastic member. In the elastic member 244 of the second aspect, the back surface, which is formed by the opposite surface 244E and the protruding portions 244F and 244G, is formed in a linear shape.

An elastic member of a third aspect will be described with reference to FIGS. 13 and 14. There is a case where the same components as those of the elastic member of the first aspect shown in FIGS. 9 and 10 are denoted by the same reference numerals as those of the elastic member of the first aspect and the description thereof are omitted. The elastic member 244 of the third aspect comprises a body portion 244B that has the shape of a substantially rectangular parallelepiped as a whole. The body portion 244B comprises a contact surface 244A, side surfaces 244C and 244D, protruding portions 244F and 244G that continue from an opposite surface 244E, and a stepped portion 244H that is adjacent to the contact surface 244A.

The elastic member 244 of the third aspect and the elastic member 244 of the first aspect are different from each other in terms of the shape of the body portion of the elastic member. In the elastic member 244 of the third aspect, the body portion 244B is not provided with a hollow portion.

It is preferable that each of the above-mentioned elastic members of the first to third aspects is formed of a molded member and is adapted to generate an elastic force by the entire elastic member. The fact that the elastic member is formed of a molded member means that the elastic member is an object manufactured by molding. Molding is a method including heating a material, such as rubber or a resin, to a high temperature, filling a mold or the like with the material, and solidifying the material with cooling, a polymerization reaction, and the like. Examples of the material include rubber, such as silicone rubber and elastomer, and a resin. Since the elastic member is formed of a molded member, the elastic member can be manufactured at a relatively low cost. Since the elastic member is formed of a molded member, an elastic force can be generated by the entire elastic member. Accordingly, a biasing force can be stably applied to the body claw.

Figure 15:
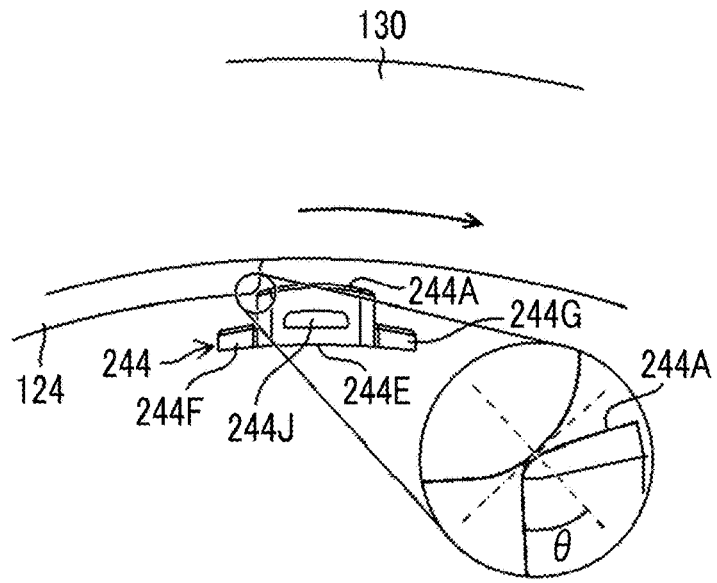
FIG. 15 is a diagram showing a state where the elastic member of the first aspect and a body claw start to be in contact with each other.

Next, the generation of an elastic force performed by the entire elastic member will be described with reference to FIGS. 15 to 29I. The state of deformation of the elastic member of the first aspect will be described with reference to FIGS. 15 to 17. FIG. 15 shows a state where the elastic member 244 of the first aspect and the body claw 124 start to be in contact with each other. As shown in an enlarged view of FIG. 15, a front end of the body claw 124 in the travel direction has a rounded shape. The rounded shape is not limited to a rounded surface shown in the drawings, and includes not only a case where a corner is chamfered (for example, a corner surface having a predetermined angle (for example, 45°)) but also a case where a corner is formed of a polygonal corner surface. Further, the shape of a front end of the contact surface 244A of the elastic member 244 is a rounded shape likewise.

Since the body claw 124 and the elastic member 244 have a rounded shape, the scrape of the elastic member 244 caused by the body claw 124 can be suppressed in a region where the body claw 124 and the elastic member 244 start to be in contact with each other. Further, the movement of the elastic member 244 in the lateral direction caused by the body claw 124 can be suppressed. In a case where the elastic member 244 is moved in the lateral direction, the elastic member 244 tends to return to the original position. As a result, there is a case where the durability of the elastic member 244 is affected by stress according to the return of the elastic member 244. Accordingly, it is preferable that the movement of the elastic member 244 in the lateral direction is suppressed. Furthermore, in a case where the movement of the elastic member 244 in the lateral direction is suppressed, the separation of the elastic member 244 from the cylindrical portion 210 (not shown) can be suppressed.

Further, in this embodiment, a contact angle θ between the body claw 124 and the elastic member 244 is preferably set to an angle that allows the body claw 124 to ride on the contact surface 244A after the body claw 124 and the elastic member 244 is in contact with each other. Since the body claw 124 rides on the contact surface 244A, the scrape of the elastic member 244, the movement of the elastic member 244 in the lateral direction, and the separation of the elastic member 244 from the cylindrical portion 210 (not shown) can be suppressed. The contact angle θ is an angle between a tangent at a point of contact between the body claw 124 and the elastic member 244 and the side surface of the elastic member 244.

Figure 16:
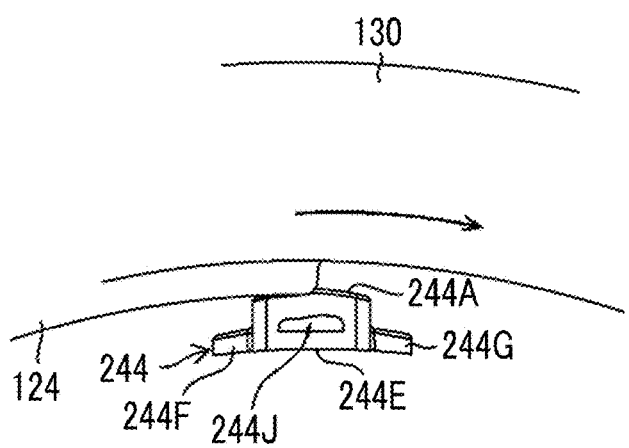
FIG. 16 is a diagram showing a state where the elastic member of the first aspect and the body claw, which do not yet reach the stop position, are in contact with each other.
Figure 16:
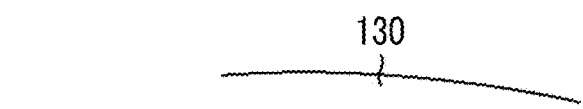

FIG. 16 shows a state where the elastic member 244 of the first aspect and the body claw 124, which do not yet reach the stop position, are in contact with each other. In a case where the body claw 124 and the elastic member 244 are in contact with each other, the elastic member 244 is deformed as shown in FIG. 16 since the body claw 124 has stiffness higher than the stiffness of the elastic member 244. Furthermore, since the elastic member 244 includes the hollow portion 244J in this aspect, the hollow portion 244J is also deformed.

Accordingly, in regard to the body claw 124, a biasing force, which is caused by the deformation of the elastic member 244 and the deformation of the hollow portion 244J, is applied to the body claw 124.

Figure 17:
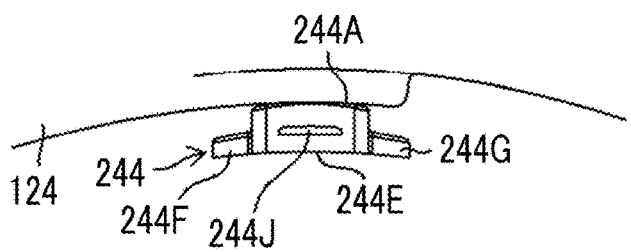
FIG. 17 is a diagram showing a state where the elastic member of the first aspect and the body claw are in contact with each other at the stop position.

FIG. 17 shows a state where the elastic member 244 of the first aspect and the body claw 124 are in contact with each other at the stop position. As shown in FIG. 17, the contact surface 244A of the elastic member 244 is deformed toward the opposite surface 244E, that is, the contact surface 244A is crushed. Further, the hollow portion 244J of the elastic member 244 is deformed overall.

FIGS. 18A to 18H are diagrams showing the distribution of resultant displacement of the elastic member of the first aspect, which is shown in FIGS. 15 to 17, based on the result of a simulation. The simulation is performed while appropriate conditions are selected in regard to a load, a mesh size, a displacement scale, and the like.

FIGS. 18A to 18H show a state where the body claw starts to be in contact with the contact surface of the elastic member. FIG. 18A is a perspective view of the elastic member viewed from the stepped portion. FIG. 18B is a front view of the elastic member viewed from the stepped portion. FIG. 18C is a back view of the elastic member. FIG. 18D is a right side view of the elastic member. FIG. 18E is a left side view of the elastic member. FIG. 18F is a perspective view of the elastic member viewed from the contact surface. FIG. 18G is a plan view of the elastic member. FIG. 18H is a bottom view of the elastic member.

FIGS. 18A to 18H show the result of the simulation with binarized data. However, the magnitude of displacement is actually displayed with colors. Displacement is increased in the order of blue (BL), light blue (LB), green (G), yellow green (YG), yellow (Y), orange (OR), and red (R). The magnitude of displacement will be described with reference to FIGS. 18A to 18H. Representative colors are shown in FIGS. 18A to 18H, FIGS. 19A to 19I, FIGS. 23A to 23H, FIGS. 24A to 24H, FIGS. 28A to 28H, and FIGS. 29A to 29I.

As shown in FIG. 18A, the protruding portions of the elastic member are blue and displacement hardly appears on the protruding portions. The contact surface of the elastic member shows light blue, green, yellow, orange, yellow, green, light blue, and blue toward the back side from the near side along the contact surface. An orange portion does not appear in the middle of the contact surface, and is positioned on the near side. In the front view of FIG. 18B, the contact surface of the elastic member shows light blue, green, yellow, orange, yellow, green, light blue, and blue toward the right from the left along the contact surface. In the back view of FIG. 18C, the contact surface of the elastic member shows light blue, green, yellow, orange, yellow, green, light blue, and blue toward the left from the right along the contact surface. In FIG. 18B, the stepped portion of a region corresponding to the orange of the contact surface is light green and a portion close to the opposite surface is also light green.

In FIG. 18C, a portion, which is close to the opposite surface, of a region, which corresponds to the orange of the contact surface, is light green. In FIG. 18D, the right side surface is blue as a whole. It can be understood that a portion close to the right side surface is hardly displaced. In FIG. 18E, the middle portion of the left side surface is light blue. In FIG. 18F, the contact surface of the elastic member shows light blue, green, yellow, orange, yellow, green, light blue, and blue toward the back side from the near side along the contact surface. In FIG. 18F, the contact surface of the elastic member shows light blue, green, yellow, orange, yellow, green, light blue, and blue toward the left from the right along the contact surface. In FIG. 18H, a region of the opposite surface of the elastic member corresponding to the orange of the contact surface is light green.

It can be understood that the amount of displacement of the elastic member at a position where the elastic member and the body claw are in contact with each other is increased as shown in FIGS. 18A to 18H after the body claw and the elastic member start to be in contact with each other. On the other hand, it can be understood that pillar portions (side surfaces) of the body portion, which are provided on both sides of the hollow portion, are hardly displaced as shown in FIGS. 18D and 18E. It can be presumed that the pillar portions provided on both sides of the hollow portion are not subjected to a force from the body claw.

Figure 19A:
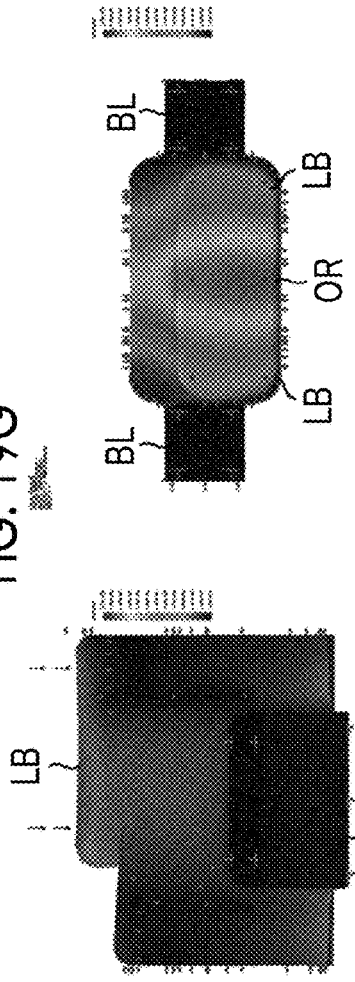
FIGS. 19A to 19I are diagrams showing the distribution of stress of the elastic member of the first aspect.
Figure 19D:
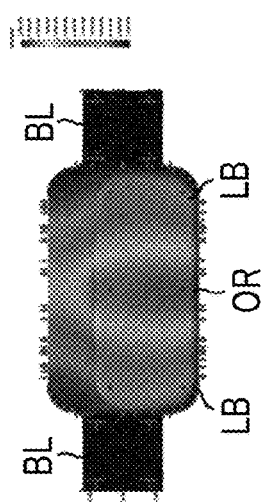
Figure 19G:
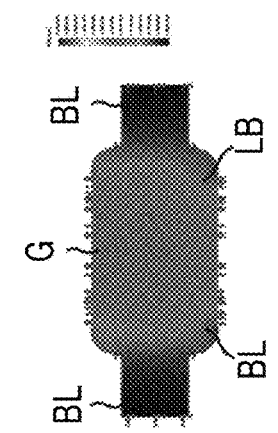
Figure 19B:
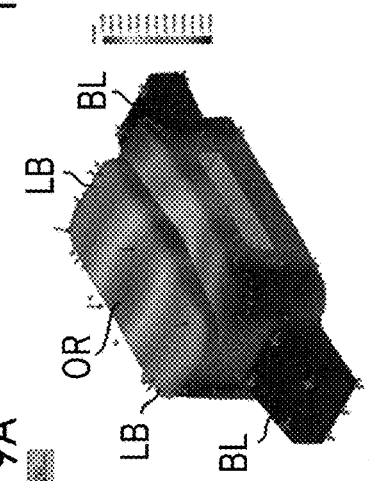
Figure 19E:
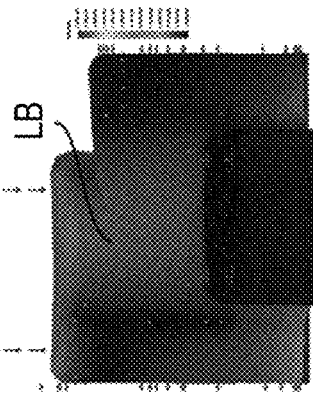
Figure 19H:
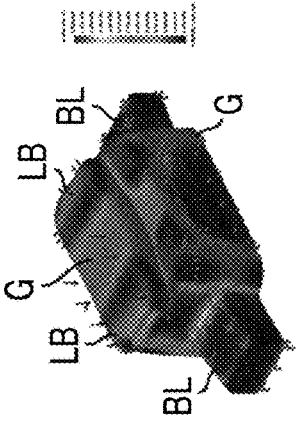
Figure 19C:
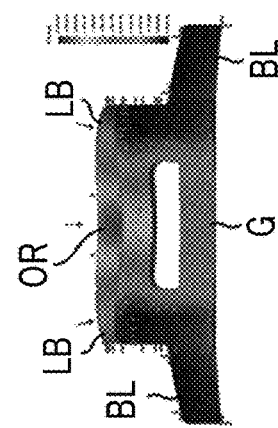
Figure 19F:
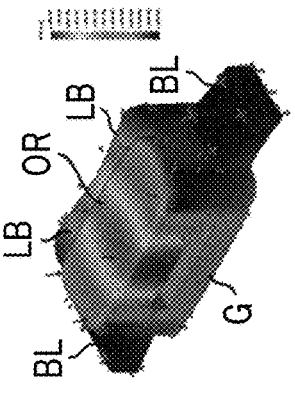
Figure 19I:
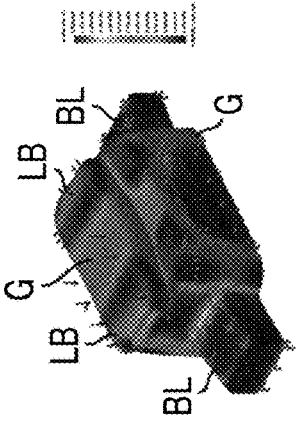

FIGS. 19A to 19I are diagrams showing the distribution of resultant displacement and stress of the elastic member of the first aspect, which is shown in FIGS. 15 to 17, based on the result of a simulation. FIGS. 19A to 19H show the distribution of resultant displacement of the first aspect at the stop position, and FIG. 19I shows the distribution of stress of the elastic member. FIG. 19A is a perspective view of the elastic member viewed from the stepped portion. FIG. 19B is a front view of the elastic member viewed from the stepped portion. FIG. 19C is a back view of the elastic member. FIG. 19D is a right side view of the elastic member. FIG. 19E is a left side view of the elastic member. FIG. 19F is a perspective view of the elastic member viewed from the contact surface. FIG. 19G is a plan view of the elastic member. FIG. 19H is a bottom view of the elastic member. FIG. 19I is a perspective view of the elastic member.

As shown in FIG. 19A, the contact surface of the elastic member shows light blue, green, yellow, orange, yellow, green, and light blue toward the back side from the near side along the contact surface. As shown in FIG. 19G, an orange region of which the displacement is large is positioned in the middle region of the contact surface since the elastic member is provided with the hollow portion. The displacement of the contact surface is symmetric with respect to the orange in the longitudinal direction of the contact surface. The protruding portions show blue. As shown in FIG. 19B, the hollow portion distributes stress, which is caused by deformation, over the entire elastic member. That is, in a stress distribution diagram shown in FIG. 19I, the contact surface shows light blue, blue, light blue, green, light blue, blue, and light blue toward the right from the left along the contact surface. This means that the hollow portion can equalize static stress applied to the elastic member. Accordingly, the concentration of stress on the protruding portions formed on the side surfaces of the elastic member can be avoided. As a result, the durability of the elastic member can be improved.

Since the contact surface of the elastic member of the first aspect has the shape of an arc protruding toward the body claw, the contact surface is equally worn out by the body claw. The durability of the elastic member can be improved in comparison with that in case where the contact surface is unequally worn out.

Figure 20:
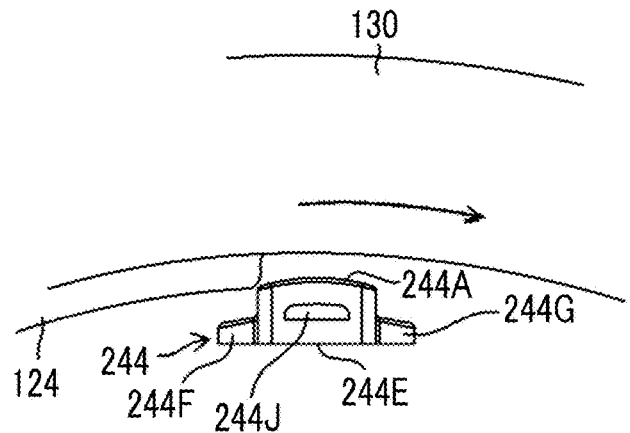
FIG. 20 is a diagram showing a state where the elastic member of the second aspect and the body claw start to be in contact with each other.

Next, the state of deformation of the elastic member of the second aspect will be described with reference to FIGS. 20 to 22. FIG. 20 shows a state where the elastic member 244 of the second aspect and the body claw 124 start to be in contact with each other. The shape of the front end of the body claw 124 in the travel direction and the shape of the front end of the contact surface 244A of the elastic member 244 are the same as those of the elastic member of the first aspect.

The shape of the back surface of the elastic member 244 of the second aspect is a linear shape unlike that of the elastic member 244 of the first aspect.

Figure 21:
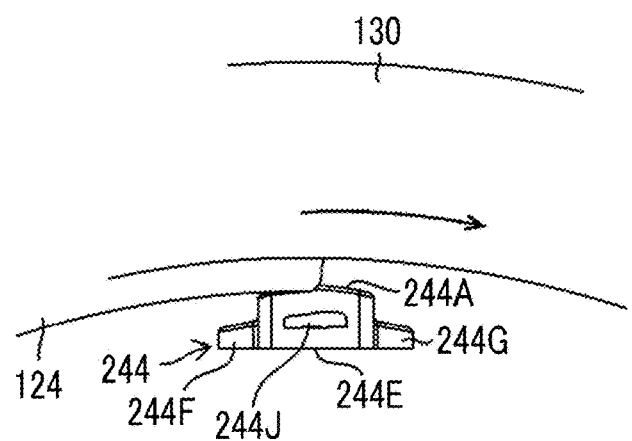
FIG. 21 is a diagram showing a state where the elastic member of the second aspect and the body claw, which do not yet reach the stop position, are in contact with each other.

FIG. 21 shows a state where the elastic member 244 of the second aspect and the body claw 124, which do not yet reach the stop position, are in contact with each other. In a case where the body claw 124 and the elastic member 244 are in contact with each other, the elastic member 244 is deformed as shown in FIG. 21 since the body claw 124 has stiffness higher than the stiffness of the elastic member 244. Furthermore, since the elastic member 244 includes the hollow portion 244J in this aspect, the hollow portion 244J is also deformed.

Accordingly, in regard to the body claw 124, a biasing force, which is caused by the deformation of the elastic member 244 and the deformation of the hollow portion 244J, is applied to the body claw 124.

Figure 22:
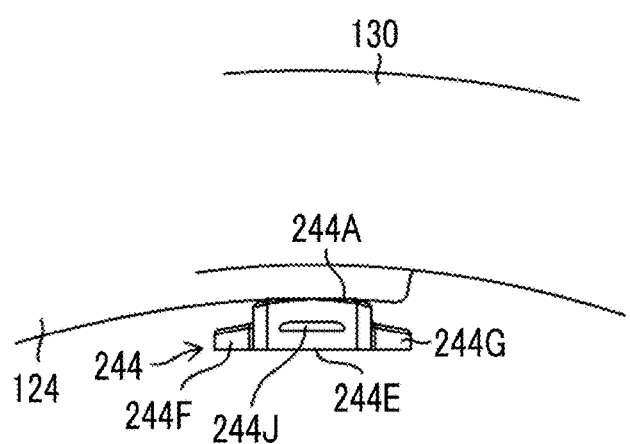
FIG. 22 is a diagram showing a state where the elastic member of the second aspect and the body claw are in contact with each other at the stop position.

FIG. 22 shows a state where the elastic member 244 of the second aspect and the body claw 124 are in contact with each other at the stop position. As shown in FIG. 22, the contact surface 244A of the elastic member 244 is deformed toward the opposite surface 244E, that is, the contact surface 244A is crushed. Further, the hollow portion 244J of the elastic member 244 is deformed overall.

FIGS. 23A to 23H are diagrams showing the distribution of resultant displacement of the elastic member of the second aspect, which is shown in FIGS. 20 to 22, based on the result of a simulation. The simulation is performed while appropriate conditions are selected in regard to a load, a mesh size, a displacement scale, and the like.

Figure 23A:
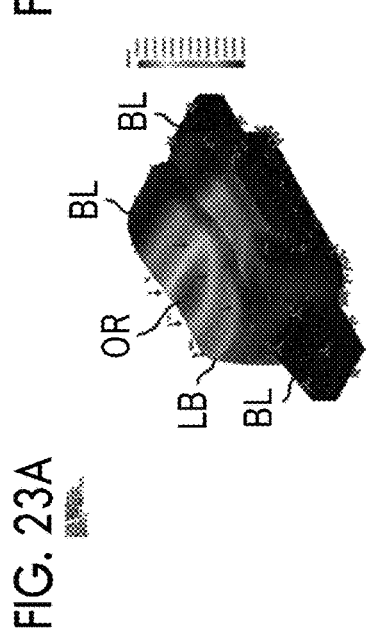
FIGS. 23A to 23H are diagrams showing the distribution of displacement of the elastic member of the second aspect.
Figure 23D:
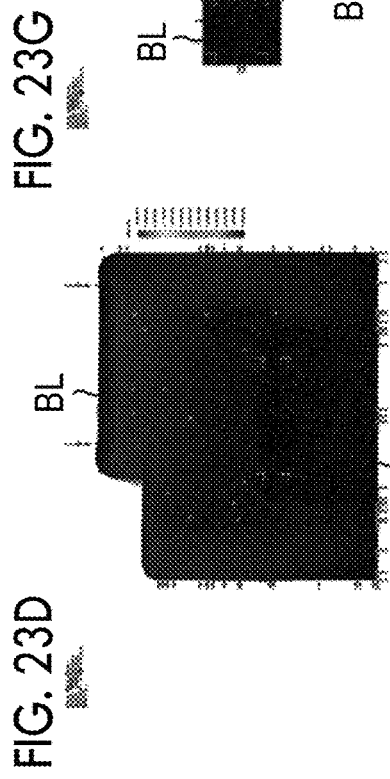
Figure 23G:
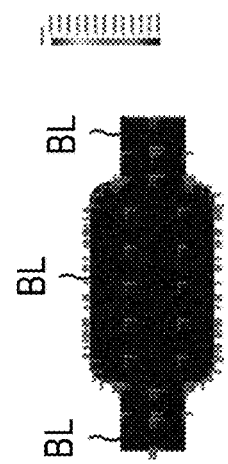
Figure 23B:
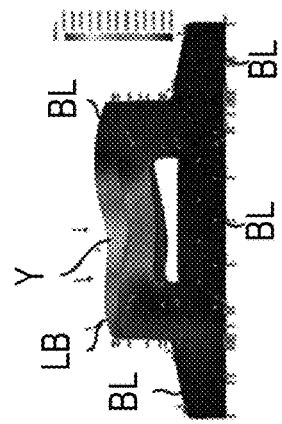
Figure 23E:
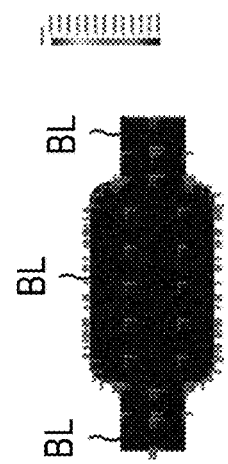
Figure 23H:
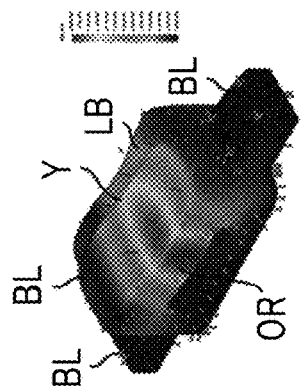
Figure 23C:
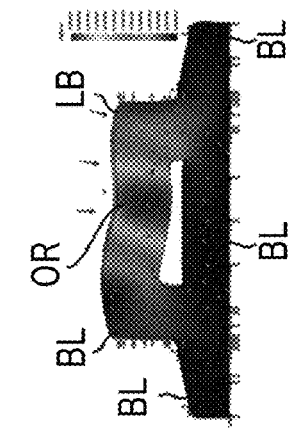
Figure 23F:
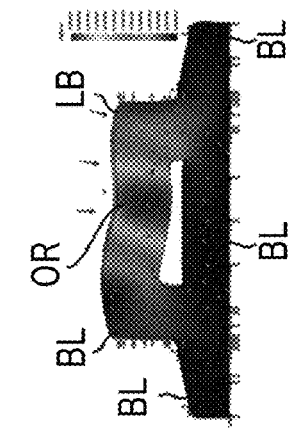

FIGS. 23A to 23H show a state where the body claw starts to be in contact with the contact surface of the elastic member. FIG. 23A is a perspective view of the elastic member viewed from the stepped portion. FIG. 23B is a front view of the elastic member viewed from the stepped portion. FIG. 23C is a back view of the elastic member. FIG. 23D is a right side view of the elastic member. FIG. 23E is a left side view of the elastic member. FIG. 23F is a perspective view of the elastic member viewed from the contact surface. FIG. 23G is a plan view of the elastic member. FIG. 23H is a bottom view of the elastic member. The positions of colors showing displacement are shown in FIGS. 23A to 23H as in FIGS. 18A to 18H. Since the protruding portions of the elastic member show blue as shown in FIG. 23A, the protruding portions are hardly displaced. The contact surface of the elastic member shows light blue, green, yellow, orange, yellow, green, light blue, and blue toward the back side from the near side along the contact surface. In FIG. 23B, a region of the contact surface, which is displaced most, is yellow.

In a case where FIG. 18B and FIG. 23B are compared with each other, it can be understood that a portion of the body portion between the hollow portion and the opposite surface is blue and is not displaced so much since the back surface (opposite surface) of the elastic member is formed in a linear shape as shown in FIG. 23B.

Figure 24A:
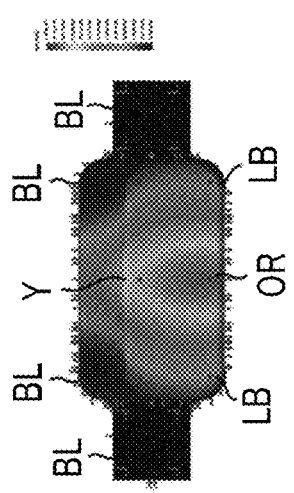
Figure 24B:
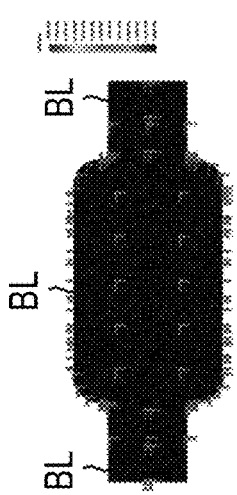
Figure 24H:
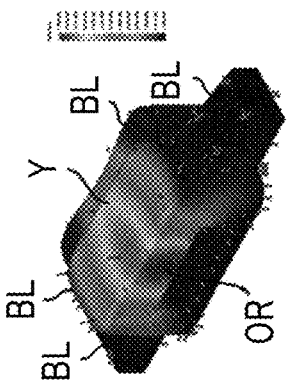
Figure 24D:
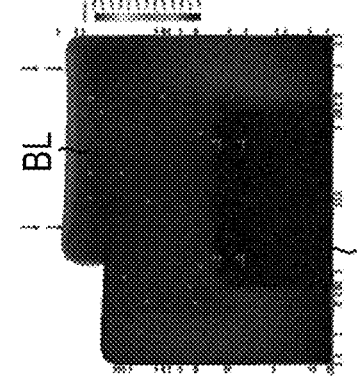
Figure 24E:
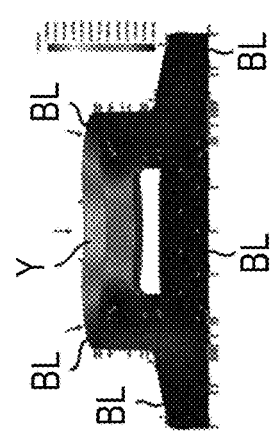
Figure 24G:
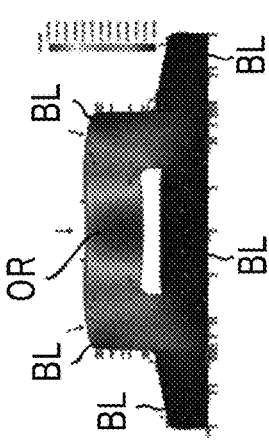
Figure 24C:
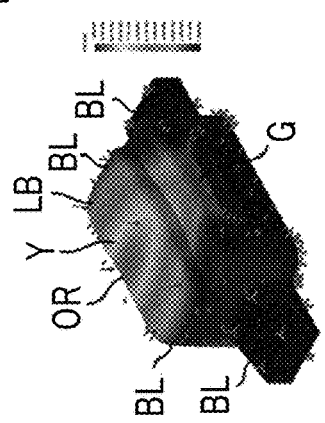

FIGS. 24A to 24H are diagrams showing the distribution of stress of the elastic member of the second aspect, which is shown in FIGS. 20 to 22, based on the result of a simulation. FIG. 24A is a perspective view of the elastic member viewed from the stepped portion. FIG. 24B is a front view of the elastic member viewed from the stepped portion. FIG. 24C is a back view of the elastic member. FIG. 24D is a right side view of the elastic member. FIG. 24E is a left side view of the elastic member. FIG. 24F is a perspective view of the elastic member viewed from the contact surface. FIG. 24G is a plan view of the elastic member. FIG. 24H is a bottom view of the elastic member.

As shown in FIG. 24G, the contact surface of the elastic member shows light blue, green, yellow, green, and light blue on the stepped portion toward the right from the left along the contact surface. Further, the contact surface of the elastic member shows light blue, green, yellow, orange, yellow, green, and light blue on the side opposite to the stepped portion toward the right from the left along the contact surface. The protruding portions show blue. An orange region of which the displacement is large is positioned in the middle region of the contact surface since the elastic member is provided with the hollow portion. The displacement of the contact surface is symmetric with respect to the orange or the yellow in the longitudinal direction of the contact surface. The hollow portion distributes stress, which is caused by deformation, over the entire elastic member. In a case where FIGS. 19B and 19C and FIGS. 24B and 24C are compared with each other, it can be understood from FIGS. 24B and 24C that a portion of the body portion between the hollow portion and the opposite surface is a blue (BL) region and stress is not distributed in this region so much. In FIGS. 24B and 24C, stress is distributed locally (to the contact surface). On the other hand, the contact surface and the opposite surface of the elastic member are displaced in FIGS. 19B and 19C. That is, it can be understood that stress is distributed over the entire elastic member. In terms of the improvement of the durability of the elastic member, the elastic member of the first aspect where stress is distributed over the entire elastic member is more preferable than the elastic member of the second aspect. In a case where stress is distributed locally, there is a concern that the elastic member is subjected to a load with time and deteriorates.

Figure 25:
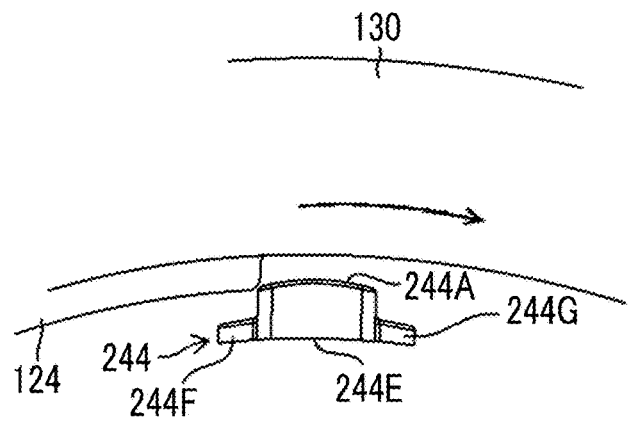
FIG. 25 is a diagram showing a state where the elastic member of the third aspect and the body claw start to be in contact with each other.

Next, the state of deformation of the elastic member of the third aspect will be described with reference to FIGS. 25 to 27. FIG. 25 shows a state where the elastic member 244 of the third aspect and the body claw 124 start to be in contact with each other. The shape of the front end of the body claw 124 in the travel direction and the shape of the front end of the contact surface 244A of the elastic member 244 are the same as that of the elastic member of the first aspect.

The elastic member 244 of the third aspect does not include a hollow portion unlike the elastic member 244 of the first aspect.

Figure 26:
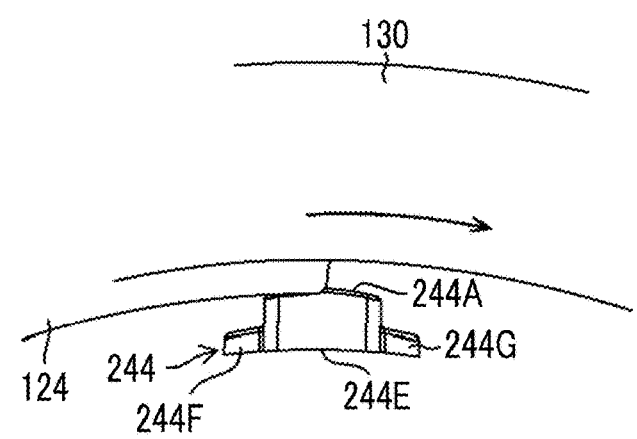
FIG. 26 is a diagram showing a state where the elastic member of the third aspect and the body claw, which do not yet reach the stop position, are in contact with each other.

FIG. 26 shows a state where the elastic member 244 of the third aspect and the body claw 124, which do not yet reach the stop position, are in contact with each other. In a case where the body claw 124 and the elastic member 244 are in contact with each other, the elastic member 244 is deformed as shown in FIG. 26 since the body claw 124 has stiffness higher than the stiffness of the elastic member 244.

Accordingly, in regard to the body claw 124, a biasing force, which is caused by the deformation of the elastic member 244, is applied to the body claw 124.

Figure 27:
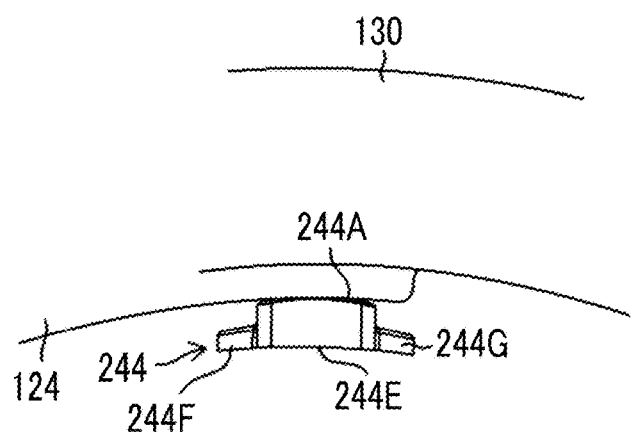
FIG. 27 is a diagram showing a state where the elastic member of the third aspect and the body claw are in contact with each other at the stop position.

FIG. 27 shows a state where the elastic member 244 of the third aspect and the body claw 124 are in contact with each other at the stop position. As shown in FIG. 27, the contact surface 244A of the elastic member 244 is deformed toward the opposite surface 244E, that is, the contact surface 244A is crushed.

FIGS. 28A to 28H are diagrams showing the distribution of resultant displacement of the elastic member of the third aspect, which is shown in FIGS. 25 to 27, based on the result of a simulation. The simulation is performed while appropriate conditions are selected in regard to a load, a mesh size, a displacement scale, and the like.

FIGS. 28A to 28H show a state where the body claw starts to be in contact with the contact surface of the elastic member. FIG. 28A is a perspective view of the elastic member viewed from the stepped portion. FIG. 28B is a front view of the elastic member viewed from the stepped portion. FIG. 28C is a back view of the elastic member. FIG. 28D is a right side view of the elastic member. FIG. 28E is a left side view of the elastic member. FIG. 28F is a perspective view of the elastic member viewed from the contact surface. FIG. 28G is a plan view of the elastic member. FIG. 28H is a bottom view of the elastic member.

As shown in FIG. 28G the contact surface of the elastic member shows green, yellow, orange, and yellow on the stepped portion toward the right from the left along the contact surface. Further, the contact surface of the elastic member shows green, yellow, and orange on the side opposite to the stepped portion toward the right from the left along the contact surface. Since the protruding portions show blue, the protruding portions are hardly displaced. It can be understood that the amount of displacement of the elastic member at a position where the elastic member and the body claw are in contact with each other is increased.

In a case where FIG. 18C is compared with FIG. 28C, the elastic member does not include a hollow portion in FIG. 28C. In FIG. 28C, the elastic member shows orange over the opposite surface from the contact surface. That is, it can be understood that the entire body portion of the elastic member is displaced. Further, since the opposite surface of the elastic member of the third aspect shows orange as shown in FIG. 28H, the opposite surface is displaced.

FIGS. 29A to 29I are diagrams showing the distribution of resultant displacement and stress of the elastic member of the third aspect, which is shown in FIGS. 25 to 27, based on the result of a simulation. FIGS. 29A to 29H show the distribution of resultant displacement of the third aspect at the stop position, and FIG. 29I shows the distribution of stress of the elastic member. FIG. 29A is a perspective view of the elastic member viewed from the stepped portion. FIG. 29B is a front view of the elastic member viewed from the stepped portion. FIG. 29C is a back view of the elastic member. FIG. 29D is a right side view of the elastic member. FIG. 29E is a left side view of the elastic member. FIG. 29F is a perspective view of the elastic member viewed from the contact surface. FIG. 29G is a plan view of the elastic member. FIG. 29H is a bottom view of the elastic member. FIG. 29I is a perspective view of the elastic member.

As shown in FIG. 29G, the contact surface of the elastic member shows green, yellow, orange, yellow, and green on the stepped portion toward the right from the left along the contact surface. Further, the contact surface of the elastic member shows yellow, orange, and yellow on the side opposite to the stepped portion toward the right from the left along the contact surface. The protruding portions show blue. As shown in FIG. 29H, a boundary, that is, a connecting portion between each protruding portion and the body portion shows light blue. The roots of the protruding portions are displaced.

Since the elastic member is not provided with a hollow portion, the elastic member is to be crushed overall as shown in FIG. 29B. However, according to the distribution of stress shown in FIG. 29I, since the elastic member of the third aspect is thick, the elastic member is not crushed and the connecting portion between each side surface and each protruding portion shows yellow and green. That is, stress is locally concentrated. As a result, there is a case where the roots of the protruding portions are fractured. It is thought that the elastic members of the first and second aspects including the hollow portions are more preferable than the elastic member of the third aspect in terms of durability.

It can be understood from the above-mentioned result that the entire elastic member of this embodiment generates an elastic force.

In a case where the lens unit is mounted on the camera body once as described above, the contact surface of the elastic member and the body claw are always in contact with each other as long as the lens unit is not detached from the camera body. The elastic member biases the body claw. On the other hand, static stress from the body claw is applied to the elastic member. Since cracks are generated in the elastic member due to static stress applied for a long period of time, there is a concern that the durability of the elastic member may be deteriorated. It is preferable that static stress is reduced after the lens unit is mounted on the camera body.

Figures 30, 31:
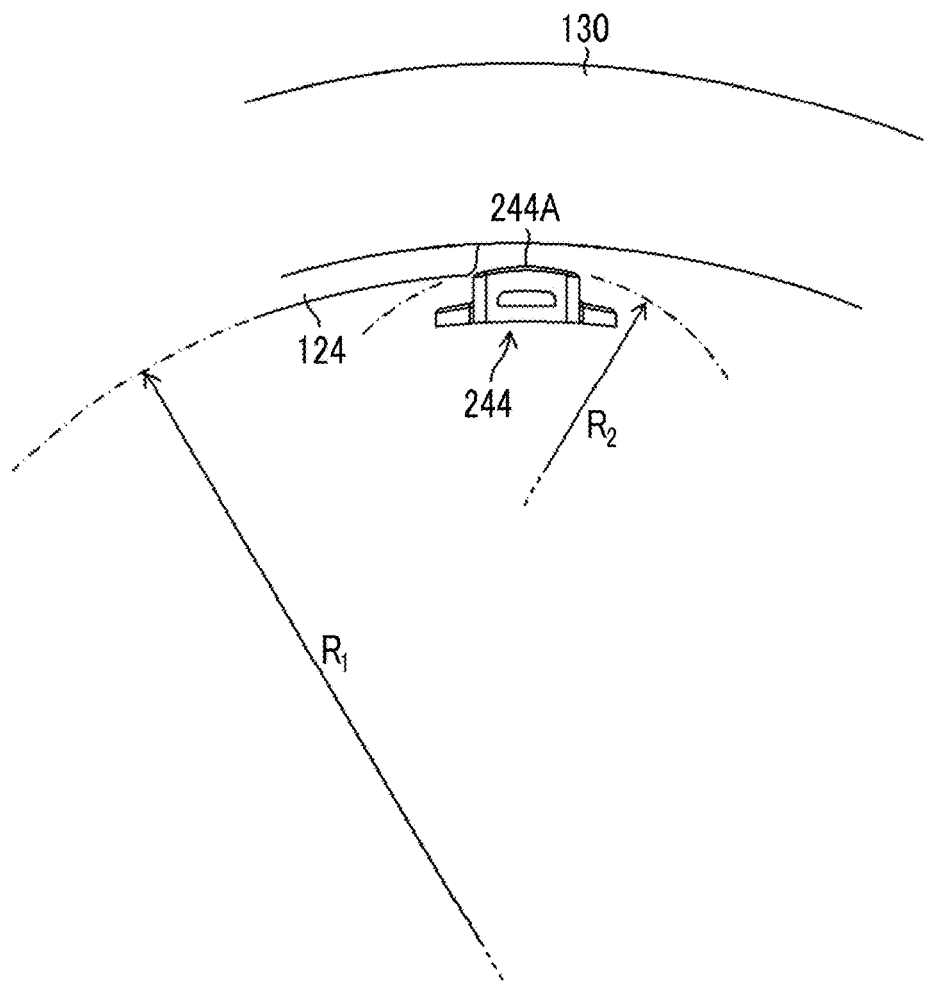
FIG. 30 is a diagram showing a state where the elastic member and the body claw are in contact with each other at the stop position.
FIG. 31 is a diagram showing a state where the elastic member and the body claw start to be in contact with each other.

FIG. 30 shows a state where the elastic member and the body claw are in contact with each other at the stop position. As shown in FIG. 30, the contact surface 244A of the elastic member 244 and the body claw 124 are in contact with each other. A dent 124B is provided on the body claw 124. Since the dent 124B is provided, static stress to be applied to the elastic member 244 can be reduced. In a case where the dent 124B is increased in size, a biasing force to be applied to the body claw 124 by the elastic member 244 is reduced. It is preferable that the size of the dent 124B is appropriately determined in consideration of the magnitude of a biasing force to be applied to the body claw 124. The dent 124B is a notch that is provided on the body claw 124 to reduce a biasing force to be applied to the elastic member 244.

In a case where the lens unit is to be mounted on the camera body, the contact surface of the elastic member and the body claw are moved relative to each other up to the stop position while being in contact with each other. For this reason, there is a concern that the contact surface of the elastic member may be worn out by the body claw. Particularly, in a case where the depth of wear is large, the durability of the elastic member is affected. Accordingly, to suppress the wear of the contact surface caused by the body claw, it is preferable that the contact area between the contact surface and the body claw is reduced, that is, the contact surface includes a region that is not in contact with the body claw.

Since the shape of the contact surface can be set to a shape where the corner of the contact surface close to the side surface is chipped off or a shape where the middle portion of the contact surface is dented as that aspect, the contact area between the contact surface and the body claw can be reduced.

FIG. 31 is a diagram showing a state where the elastic member and the body claw start to be in contact with each other. As shown in FIG. 31, the contact surface 244A of the elastic member 244 has the shape of an arc that protrudes toward the body claw 124. The body claw 124 has the shape of an arc that protrudes toward the inner peripheral side from the body mount ring 130. In an embodiment shown in FIG. 31, the curvature (1/R2) of the contact surface 244A is set to be larger than the curvature (1/R1) of the inner diameter of the body claw 124. Since the arc of the contact surface 244A is sharper than the arc of the body claw 124, the regions of the contact surface 244A close to the side surfaces become non-contact regions that are not in contact with the body claw 124. Accordingly, since the contact area can be reduced, the wear resistance of the elastic member 244 can be improved.

Figure 32:
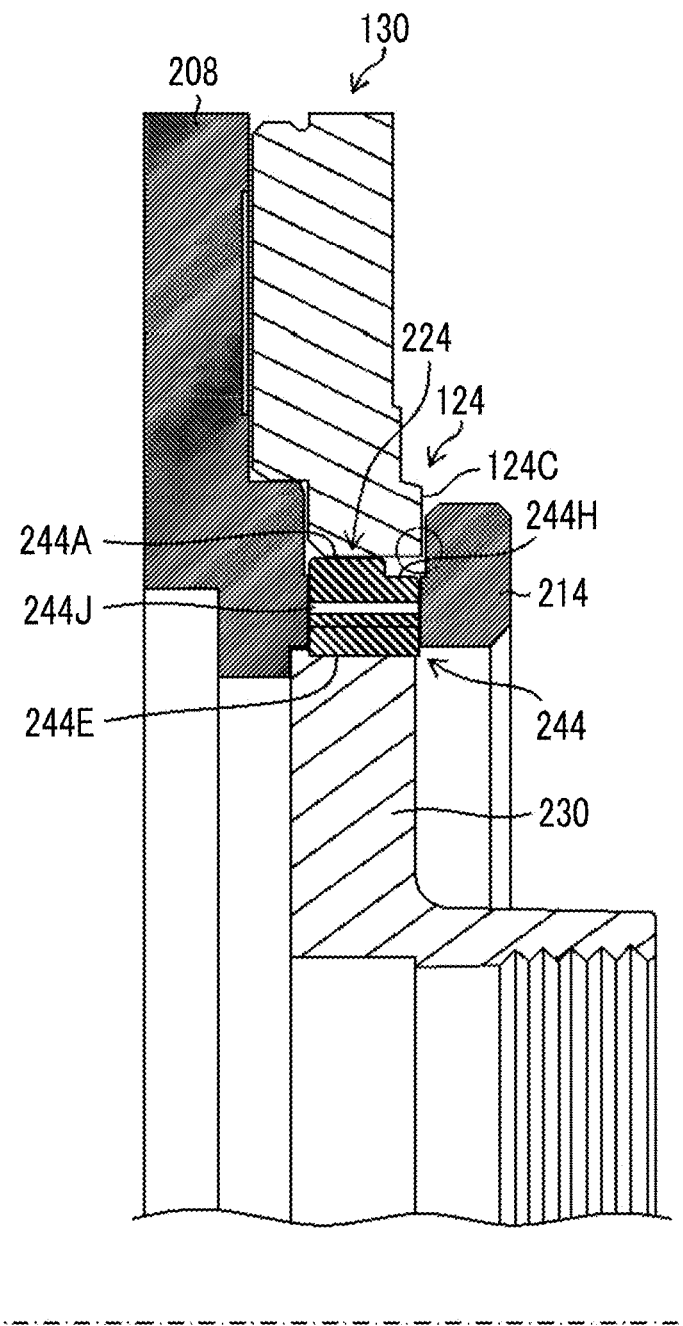
FIG. 32 is an enlarged cross-sectional view of the lens mount and the body mount.

In addition, an aspect where the wear resistance of the contact surface of the elastic member can be improved will be described. FIG. 32 is an enlarged cross-sectional view of the lens mount and the body mount. FIG. 32 is a cross-sectional view viewed in a direction orthogonal to the optical axis OA of the optical system (not shown). As shown in FIG. 32, the lens mount-reference surface of the lens mount ring 208 and the body mount-reference surface of the body mount ring 130 are in contact with each other. The body claw 124 is formed integrally with the body mount ring 130. The body claw 124 is engaged with the bayonet groove 224. The elastic member 244 protrudes outward from the through-hole of the cylindrical portion 210 (not shown). The opposite surface 244E of the elastic member 244 is supported by the mount cover 230.

The elastic member 244 includes the stepped portion 244H in the direction of the optical axis OA. The stepped portion 244H is provided closer to the front side than an end face 124C of the body claw 124 close to the camera. As a result, the stepped portion 244H is disposed at a position where the contact between the edge of the body claw 124, which is surrounded by a circle, and the stepped portion 244H is avoided. There is a case where an edge from which burrs protrude as described above is formed in a process for manufacturing the body claw 124. In a case where the edge and the contact surface 244A of the elastic member 244 are in contact with each other, there is a concern that the contact surface 244A may be worn out or scraped off. Since the contact between the edge and the contact surface is avoided by the stepped portion 244H, the wear of the contact surface 244A can be prevented. Accordingly, the wear resistance of the elastic member 244 can be improved.

Second Embodiment

A lens unit of a second embodiment will be described. The same components as the components of the first embodiment will be denoted by the same reference numerals as the reference numerals of the first embodiment, and the description thereof will be omitted. In the first embodiment, the elastic members are arranged on the lens mount of the lens unit at the front end positions of the body claws in the travel direction at the stop position of the body claws. On the other hand, in the second embodiment, each body claw includes a notched portion that is provided between front and rear ends of each body claw in a travel direction and is spaced away from the elastic member, and the elastic members are arranged at rear end positions of the body claws in the travel direction at a stop position of the body claws.

Figure 33:
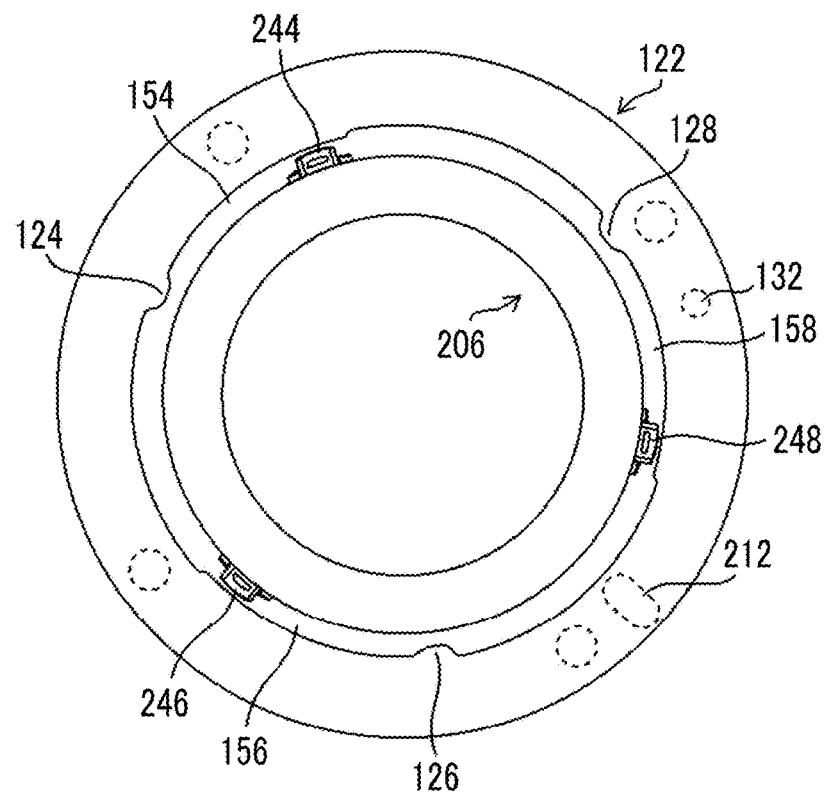
FIG. 33 is a diagram showing the states of the lens mount and the body mount, which do not yet reach the stop position, viewed from the rear side on the optical axis.
Figure 34:
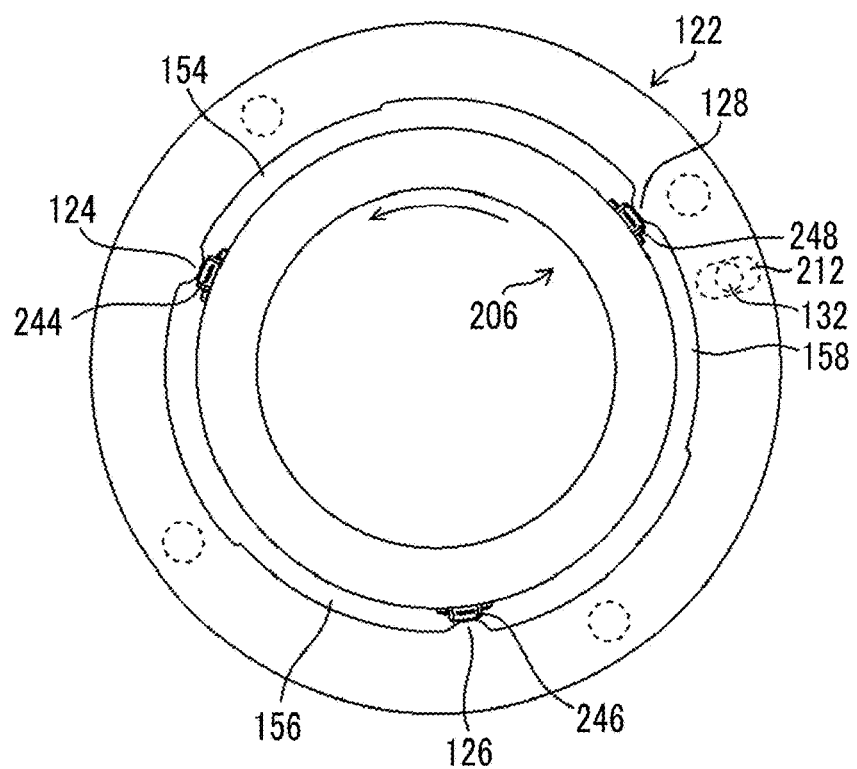
FIG. 34 is a diagram showing a state where the lens mount is mounted on the body mount at the stop position, viewed from the rear side on the optical axis.

The mounting of a lens unit 200 (not shown) on the camera body 100 (not shown) will be described with reference to FIGS. 33 and 34. FIG. 33 is a diagram showing the states of the lens mount and the body mount, which do not yet reach the stop position, viewed from the rear side on an optical axis. FIG. 34 is a diagram showing a state where the lens mount is mounted on the body mount at the stop position, viewed from the rear side on the optical axis.

As shown in FIG. 33, bayonet claws 214, 216, and 218 (not shown) of a lens mount 206 and body claws 124, 126, and 128 of a body mount 122 are positioned at positions where the bayonet claws and the body claws do not interfere with each other. The lens unit 200 is fitted to the camera body 100 in this state, and the lens mount-reference surface of the lens mount 206 and the body mount-reference surface of the body mount 122 are in contact with each other.

Notched portions 154, 156, and 158 are provided on the body claws 124, 126, and 128 of this embodiment along the inner peripheries of the body claws 124, 126, and 128.

The notched portions 154, 156, and 158 are provided between front and rear ends of the body claws 124, 126, and 128 in the travel direction, and allow the elastic members 244, 246, and 248 and the body claws 124, 126, and 128 to be spaced away from each other.

In a state where the lens mount-reference surface and the body mount-reference surface are in contact with each other, the lens unit 200 and the camera body 100 are rotated relative to each other. In a case where the lens mount 206 is rotated counterclockwise and the body mount 122 is rotated clockwise in FIG. 33, the body claws 124, 126, and 128 and the elastic members 244, 246, and 248 are moved relative to each other. The lens mount 206 is rotated counterclockwise in FIG. 33 to facilitate understanding. The lens unit 200 is rotated clockwise in a case where the lens unit 200 is viewed toward the rear side from the front side in the direction of the optical axis OA.

In this embodiment, the body claws 124, 126, and 128 and the corresponding elastic members 244, 246, and 248 are arranged at positions where the body claws 124, 126, and 128 and the corresponding elastic members 244, 246, and 248 face each other in a state where the lens unit 200 is fitted to the camera body 100. There is a case where the layout of the elastic members 244, 246, and 248 is limited due to an arrangement relationship of peripheral components of the body mount 122 in a case where the lens unit 200 is fitted to the camera body 100. For this reason, the elastic members 244, 246, and 248 are arranged at the positions facing the body claws 124, 126, and 128.

On the other hand, in a state where the lens unit 200 is fitted to the camera body 100, the body claws 124, 126, and 128 and the elastic members 244, 246, and 248 can be spaced away from each other since the notched portions 154, 156, and 158 are provided as shown in FIG. 33.

In a case where the lens unit 200 and the camera body 100 are rotated relative to each other, the bayonet claws 214, 216, and 218 (not shown) are moved to the rear sides of the corresponding body claws 124, 126, and 128, that is, the body claws 124, 126, and 128 are moved to the corresponding bayonet grooves 224, 226, and 228. Accordingly, the body claws 124, 126, and 128 and the bayonet grooves 224, 226, and 228 start to overlap with each other in a case where the body claws 124, 126, and 128 and the bayonet grooves 224, 226, and 228 are viewed in the direction of the optical axis.

The locking pin 132 of the camera body 100 is inserted into the pin hole 212 of the lens unit 200 as shown in FIG. 34 in a case where the lens unit 200 and camera body 100 are rotated relative to each other. The rotation of the lens unit 200 is locked. Accordingly, since the rotation of the lens unit 200 is restricted, the separation of the lens unit 200 from the camera body 100 can be prevented. Therefore, the lens unit 200 is mounted on the camera body 100.

In this embodiment, as shown in FIG. 34, the elastic members 244, 246, and 248 are arranged at the rear end positions of the body claws 124, 126, and 128 in the travel direction at the stop position of the body claws 124, 126, and 128.

At the rear end positions, the contact surfaces 244A, 246A, and 248A of the elastic members 244, 246, and 248 are in contact with the corresponding body claws 124, 126, and 128, respectively. The elastic members 244, 246, and 248 are elastically deformed in a case where the elastic members 244, 246, and 248 are in contact with the body claws 124, 126, and 128. As a result, the elastic members 244, 246, and 248 bias the corresponding body claws 124, 126, and 128 in a radial direction. The radial direction is a direction orthogonal to the optical axis OA, is a radial direction having a center on the optical axis OA, and is also referred to as a radial direction. Orthogonal includes orthogonal and substantially orthogonal, and the center includes a center and a substantial center.

Since the body claws 124, 126, and 128 include the notched portions 154, 156, and 158 in this embodiment, the contact between the body claws 124, 126, and 128 and the elastic members 244, 246, and 248 can be avoided until the rear ends of the body claws 124, 126, and 128 in the travel direction.

Third Embodiment

Figure 35:
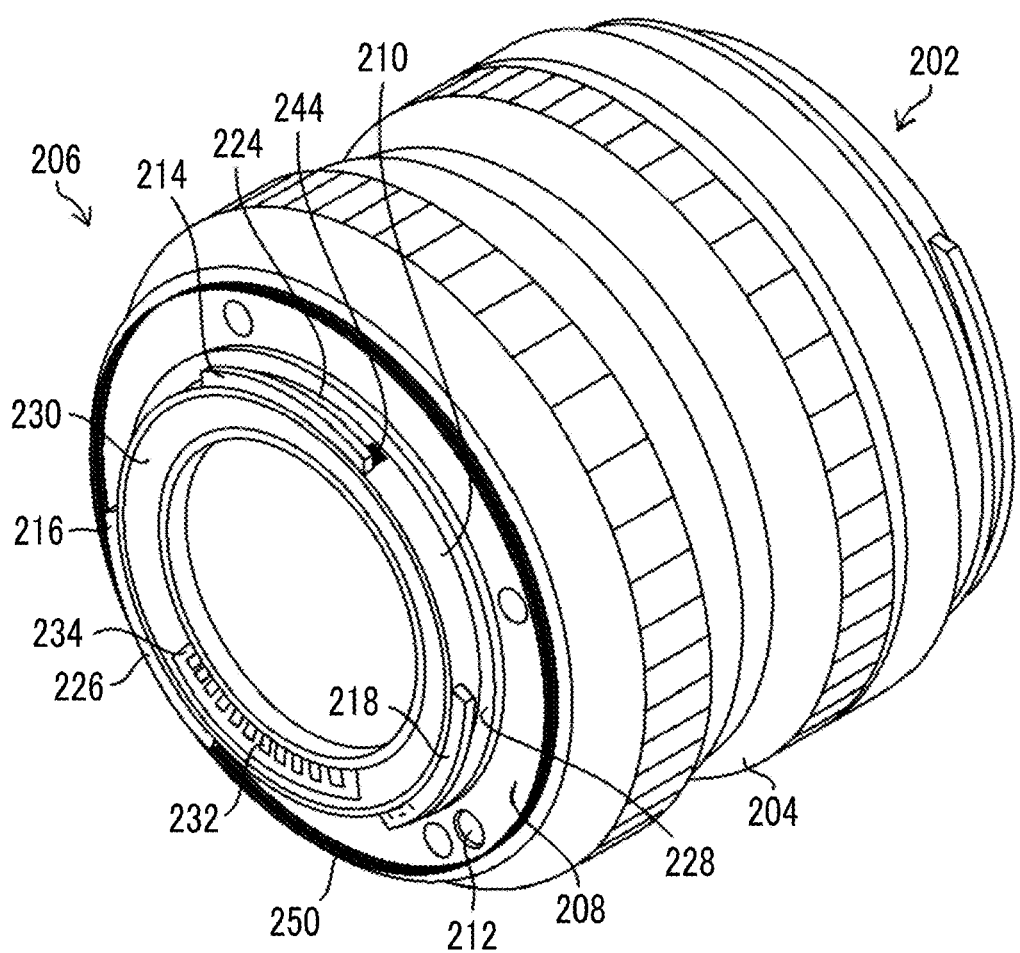
FIG. 35 is a perspective view showing the appearance of a lens unit of another embodiment.

Next, a lens unit of a third embodiment will be described. FIG. 35 is a perspective view showing the appearance of the lens unit of the third embodiment. The same components as the components of the lens units 200 of the first and second embodiments will be denoted by the same reference numerals as the reference numerals of the first and second embodiments, and the description thereof will be omitted. A difference between the lens unit of the third embodiment and the lens units 200 of the first and second embodiments will be described mainly.

As shown in FIG. 35, an annular elastic member 250 is mounted on the outer periphery of a lens mount ring 208. In a case where a lens unit 200 is mounted on the camera body (not shown), the outer peripheral surface of the body mount ring of the camera body is biased in the radial direction by an elastic force of the annular elastic member 250 as described later.

Figure 36:
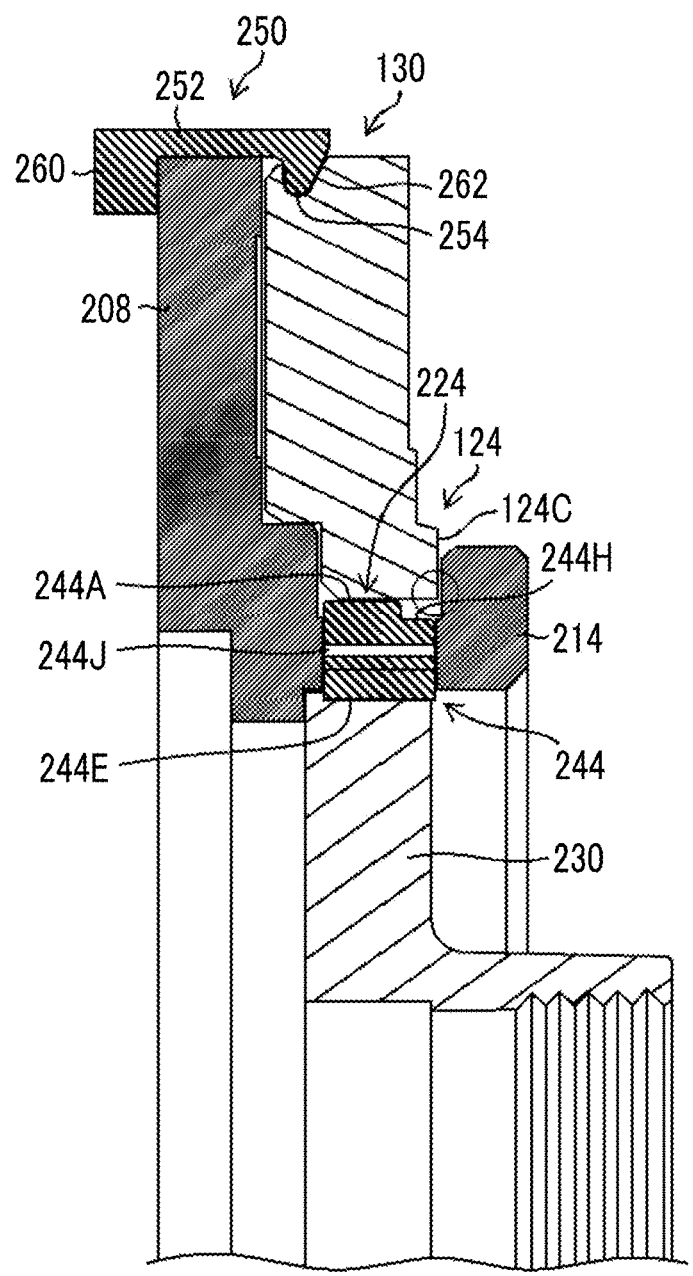
FIG. 36 is an enlarged cross-sectional view of a lens mount and a body mount.

FIG. 36 is an enlarged cross-sectional view of the lens mount and the body mount. As shown in FIG. 36, the annular elastic member 250 is mounted on the lens mount ring 208. Since the inner diameter of the annular elastic member 250 is smaller than the outer diameter of the lens mount ring 208, the annular elastic member 250 can be attachably and detachably fixed to the outer peripheral surface of the lens mount ring 208 by the elastic force of the annular elastic member 250.

As shown in FIG. 36, the annular elastic member 250 includes a cylindrical part 252 that includes a protruding portion 254 protruding toward an inner peripheral side from one end side of the cylindrical part 252. On a Z direction (see FIG. 1), one end side is the rear side and the other end side is the front side.

The cylindrical part 252 includes a flange portion 260 that protrudes toward the inner peripheral side from the other end side of the cylindrical part 252. The flange portion 260 of the annular elastic member 250 and the front surface of the lens mount ring 208 are in contact with each other.

Rubber, elastomer, a molding resin, or the like can be used as the material of the annular elastic member 250. Examples of the rubber can include silicone rubber.

The protruding portion 254 can be provided with a chamfer 262. Since the chamfer 262 is inclined toward the inner peripheral side and the other end side of the annular elastic member 250, the annular elastic member 250 is easily mounted on the body mount ring 130.

The cross section of the protruding portion 254 can be set to the shape of a curved surface. In a case where the cross section of the protruding portion 254 is set to the shape of a curved surface, the contact area between the outer peripheral surface of the body mount ring 130 and the protruding portion 254 can be increased. The shape of an arc, the shape of an elliptical arc, and the shape of a parabola can be exemplified as the shape of a curved surface. However, the cross-sectional shape of the protruding portion 254 is not limited to the shape of a curved surface, and may be a rectangular shape or a polygonal shape. Since the protruding portion 254 is likely to be crushed in a case where the protruding portion 254 is set to the shape of a curved surface, the contact area between the outer peripheral surface of the body mount ring 130 and the protruding portion 254 can be increased.

The protruding portion 254 biases the body mount ring 130 in the radial direction by the elastic force of the annular elastic member 250. Particularly, since the protruding portion 254 is provided over the entire annular elastic member 250, the protruding portion 254 is in contact with the whole circumference of the body mount ring 130. Accordingly, since it is possible to adjust the amount of torque, which is required in a case where the lens unit 200 is to be manually rotated, by the elastic members 244 (246 and 248) and the annular elastic member 250, it is possible to give good feeling to an operator.

Further, since the amount of torque obtained in the third embodiment is larger than that obtained in a case where only the elastic members 244, 246, and 248 described in the first and second embodiments are provided, the backlash of the lens mount caused by the rotational movement of the lens unit 200 for zooming can be suppressed. The amount of torque of about 50 N can be obtained in a case where only the elastic members 244, 246, and 248 are provided. However, in a case where the annular elastic member 250 is further provided, the amount of torque can be increased up to about 60 N. It is possible to more finely adjust the amount of torque by adjusting the hardness of the material of the annular elastic member 250.

Speed at which the body mount ring 130 and the lens mount ring 208 come into contact with each other can be reduced by the annular elastic member 250. As a result, sound, which is generated in a case where the lens unit 200 and the camera body 100 are to come into contact with each other, can be reduced. Since the annular elastic member 250 covers the whole circumference of the body mount ring 130 and the lens mount ring 208, the leakage of sound can be suppressed.

Since the protruding portion 254 of the annular elastic member 250 presses the outer peripheral surface of the body mount ring 130 as shown in FIG. 36, the camera system can obtain a dust-proof effect and a drip-proof effect by the annular elastic member 250.

The protruding portion 254 of the annular elastic member 250 is engaged with a recessed portion of the body mount ring 130 in the embodiment of FIG. 36, but the body mount ring 130 does not need to be provided with the recessed portion.

Figure 37:
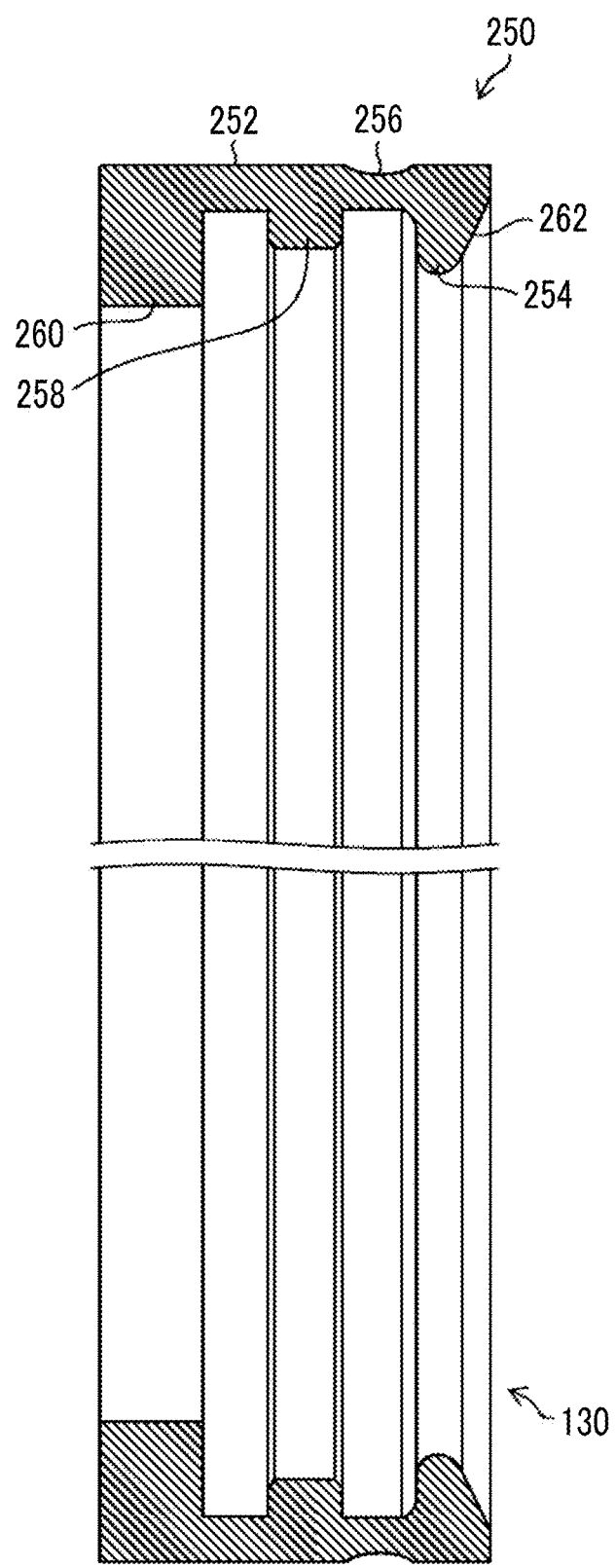
FIG. 37 is a cross-sectional view of an annular elastic member.

FIG. 37 is a cross-sectional view of an annular elastic member 250 of another aspect. The annular elastic member 250 includes a cylindrical part 252. The cylindrical part 252 includes a protruding portion 254 that protrudes toward an inner peripheral side from one end side of the cylindrical part 252 and a dent 256 that is positioned on the outer peripheral side opposite to the protruding portion 254 so as to be closer to the other end side of the cylindrical part 252 than the protruding portion 254.

The cylindrical part 252 includes a projection portion 258 that is positioned near a middle portion of the cylindrical part 252 and protrudes toward the inner peripheral side, and includes a flange portion 260 that is positioned on the other end side of the cylindrical part 252 and protrudes toward the inner peripheral side.

A recessed portion is provided on the outer portion of the lens mount ring (not shown) and is engaged with the projection portion 258 of the annular elastic member 250, so that the annular elastic member 250 and the lens mount ring can be positioned. Further, a recessed portion is provided on the annular elastic member 250 instead of the projection portion 258, a projection portion is provided on the outer portion of the lens mount ring, and both the recessed portion and the projection portion are engaged with each other, so that the annular elastic member 250 and the lens mount ring can be positioned. A dust-proof effect and a drip-proof effect can be improved by the engagement between the recessed portion and the projection portion.

The annular elastic member 250 is provided with the dent 256. The dent 256 of the cylindrical part 252 serves as a fulcrum, and allows the protruding portion 254 of the annular elastic member 250 to be displaced outward in the radial direction. It is preferable that the dent 256 has the shape of an arc. The shape of an arc includes an arc, an elliptical arc, a parabola, and the like.

Since the dent 256 serves as a fulcrum and the protruding portion 254 is displaced outward in the radial direction of the body mount ring 130 as described above, it is possible to prevent the annular elastic member 250 from being entangled in the lens mount and the body mount.

Further, since stress is distributed over the entire protruding portion 254, which is to be displaced, by the dent 256, the concentration of stress can be avoided. As a result, the durability of the annular elastic member 250 can be improved. In terms of the distribution of stress, it is preferable that the dent 256 has the shape of an arc.

EXAMPLES

Preferred aspects of the elastic member according to the invention will be described below using Examples. The shape, material, and the like to be described Examples to be described below can be appropriately changed without departing from the scope of the invention. Accordingly, the scope of the invention should not be interpreted in a limited way by specific examples to be described below.

A relationship between the rubber hardness of an elastic member and feeling and sound, mounting feeling, and dimensional accuracy was examined in Examples to be described below. The elastic member of the first aspect was used as the elastic member, and silicone rubber was used as a molded member. The hardness of the elastic member was changed to 80 degrees from 40 degrees at an interval of 10 degrees. The rubber hardness of the elastic member was measured by Type A durometer based on JISK 6253. Sensory evaluation was performed in regard to a feeling index and mounting feeling. In regard to a feeling effect, the best feeling effect was set as 1 and relative evaluation was performed. Further, in regard to mounting feeling, the best operation feeling and liltingness were set as 1 and relative evaluation was performed. In regard to dimensional accuracy, the best dimensional accuracy was set as 1 and relative evaluation was performed.

Figure 38:
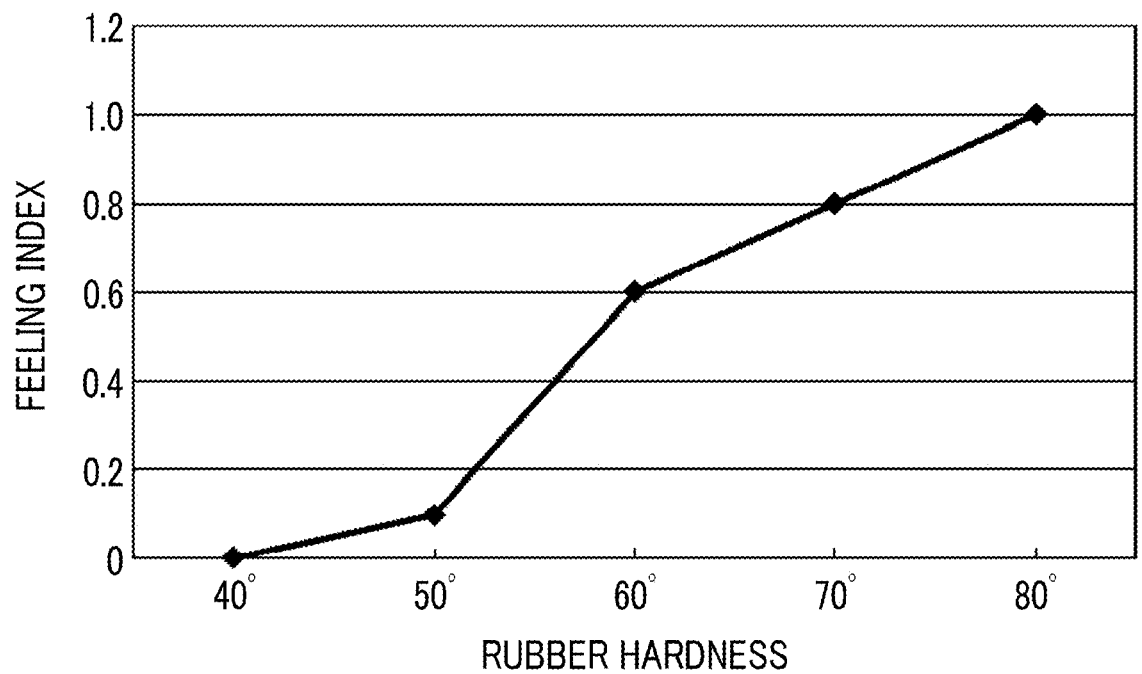
FIG. 38 is a graph showing a relationship between rubber hardness and feeling and sound.
Figure 39:
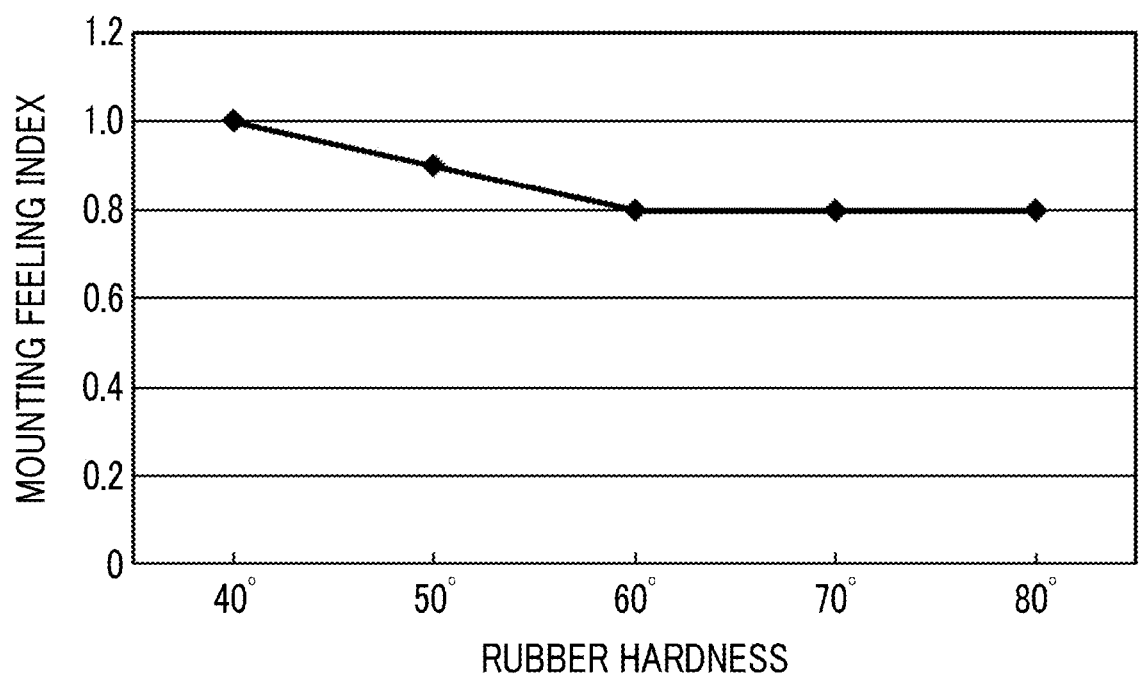
FIG. 39 is a graph showing a relationship between rubber hardness and mounting feeling.
Figure 40:
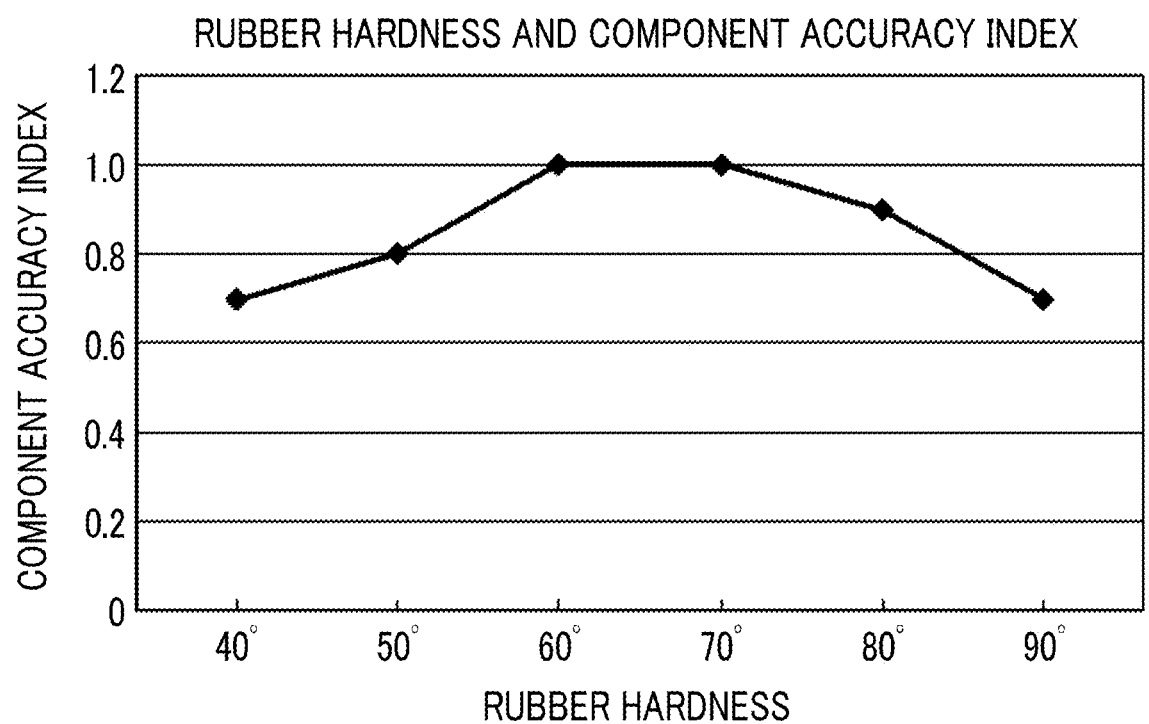
FIG. 40 is a graph showing a relationship between rubber hardness and dimensional accuracy.

FIG. 38 is a graph showing a relationship between rubber hardness and feeling and sound. A horizontal axis represents the rubber hardness of the elastic member, and a vertical axis represents a feeling index. FIG. 39 is a graph showing a relationship between rubber hardness and mounting feeling. A horizontal axis represents the rubber hardness of the elastic member, and a vertical axis represents a mounting feeling index. FIG. 40 is a graph showing a relationship between rubber hardness and dimensional accuracy. A horizontal axis represents the rubber hardness of the elastic member, and a vertical axis represents a component accuracy index.

According to the graph of FIG. 38, it can be understood that feeling is improved in a case where rubber hardness exceeds 50 degrees. According to the graph of FIG. 39, it can be understood that an influence on mounting feeling is not changed in a case where rubber hardness exceeds 60 degrees. According to the graph of FIG. 40, it can be understood that a range where dimensional accuracy and cost are compatible with each other in regard to the shape of the elastic member is the range of rubber hardness of 60 to 80 degrees.

From the above-mentioned results, it can be understood that rubber hardness is preferably in the range of 60 to 80 degrees.

EXPLANATION OF REFERENCES

1: camera system
100: camera body
102: shutter button
104: exposure correction dial
106: shutter speed dial
108: focus mode switching lever
110: finder switching lever
112: lens attachment/detachment button
114: power lever
116: hot shoe
118: electronic view finder
120: grip
122: body mount
124: body claw
124A: front end position
124B: dent
124C: end face
126: body claw
128: body claw
130: body mount ring
132: locking pin
134: opening
136: signal contact
138: seat
144: mount spring
146: mount spring
148: mount spring
150: image sensor
154: notched portion
156: notched portion
158: notched portion
200: lens unit
202: optical system
204: lens barrel
206: lens mount
208: lens mount ring
210: cylindrical portion
210A: through-hole
210B: through-hole
210C: through-hole
212: pin hole
214: bayonet claw
216: bayonet claw
218: bayonet claw
224: bayonet groove
226: bayonet groove
228: bayonet groove
230: mount cover 232: signal contact
234: seat
244: elastic member
244A: contact surface
244B: body portion
244C: side surface
244D: side surface
244E: opposite surface
244F: protruding portion
244G: protruding portion
244H: stepped portion
244J: hollow portion
246: elastic member
246A: contact surface
248: elastic member
248A: contact surface
250: annular elastic member
252: cylindrical part
254: protruding portion
256: dent
258: projection portion
260: flange portion
262: chamfer
OA: optical axis
θ: contact angle

What is claimed is:

1. A lens unit comprising:
an optical system that includes at least one lens;
a lens barrel that receives the optical system; and
a lens mount that is provided on one end side of the lens barrel and is mounted on a body mount provided on a camera,
wherein the lens mount includes:
a reference surface that is in contact with the body mount;
a cylindrical portion that extends to the body mount from the reference surface;
a plurality of bayonet claws that are provided in a circumferential direction of the cylindrical portion and extend outward in a radial direction, a plurality of bayonet grooves that are defined by the reference surface, the cylindrical portion, and the plurality of bayonet claws and are engaged with body claws of the body mount; and
an elastic member that is provided in at least one bayonet groove of the plurality of bayonet grooves, includes a contact surface to be in contact with the body claw, is provided in a rotational direction of the body claw, and applies a biasing force to the body claw in the radial direction,
wherein the elastic member is a molded member made of rubber of resin,
wherein the contact surface extends in the circumferential direction,
wherein the elastic member includes a stepped portion that is adjacent to the contact surface in parallel, extends in the circumferential direction and is provided in a direction of an optical axis, the stepped portion configured so as not to be brought into contact with the body claw, and
wherein the elastic member includes a rectangular portion having long sides extending in the circumferential direction and short sides extending in the radial direction, the rectangular potion having a hollow portion that passes between the contact surface and an opposite surface of the contact surface in the direction of the optical axis.

2. The lens unit according to claim 1,
wherein the elastic member is disposed at a position where the elastic member is in contact with the body claw at a stop position of the body claw.

3. The lens unit according to claim 1,
wherein the elastic member is adapted to generate an elastic force by the entire elastic member.

4. The lens unit according to claim 2,
wherein the elastic member is disposed at a front end position of the body claw in a travel direction at the stop position of the body claw.

5. The lens unit according to claim 2,
wherein the body claw includes a notched portion that is provided between front and rear ends of the body claw in a travel direction and is spaced away from the elastic member, and the elastic member is disposed at a rear end position of the body claw in the travel direction at the stop position of the body claw.

6. The lens unit according to claim 1,
wherein the elastic member is provided in each of the plurality of bayonet grooves.

7. The lens unit according to claim 1,
wherein the cylindrical portion includes a through-hole, and the elastic member protrudes from an inner peripheral side of the cylindrical portion through the through-hole.

8. The lens unit according to claim 7, further comprising:
a mount cover that is fixed to the inner peripheral side of the cylindrical portion, includes a peripheral portion, and is supported by the peripheral portion,
wherein the mount cover supports the elastic members from the inner peripheral side.

9. The lens unit according to claim 1,
wherein a surface of the elastic member opposite to the contact surface has the shape of an arc protruding toward the contact surface.

10. The lens unit according to claim 1,
wherein the contact surface of the elastic member has the shape of an arc protruding toward the body claw.

11. The lens unit according to claim 1,
wherein the contact surface has a curvature larger than the inner diameter of the body claw.

12. The lens unit according to claim 1,
wherein a front end of the body claw in a travel direction has a rounded shape, and a front end of the contact surface of the elastic member in the travel direction has a rounded shape.

13. The lens unit according to claim 1,
wherein a contact angle between the body claw and the elastic member is set to an angle that allows the body claw to ride on the contact surface after the body claw and the elastic member are in contact with each other.

14. The lens unit according to claim 1,
wherein the stepped portion is provided closer to a front side than an end face of the body claw, which is close to the camera, in a cross section taken in a direction orthogonal to the optical axis of the optical system.

15. The lens unit according to claim 1, further comprising:
an annular elastic member that is mounted on the lens mount and includes a protruding portion positioned on one end side of the annular elastic member and protruding toward an inner peripheral side.

16. The lens unit according to claim 15,
wherein the annular elastic member includes a dent that is positioned on an outer peripheral side opposite to the protruding portion so as to be closer to the other end side of the annular elastic member than the protruding portion.

17. The lens unit according to claim 1,
wherein the elastic member has a first height outward in the radial direction,
wherein the stepped portion has a uniform second height shorter than the first height outward in the radial direction, and
wherein the stepped portion has a flat surface on a side of the body claw.

18. The lens unit according to claim 15,
wherein the contact surface of the elastic member is not into contact with the the body claw till just before the elastic member reaches a stop posiotion of rotation of the body claw, and is into contact with the body claw at the stop position of the rotation of the body claw.

19. A camera system comprising:
the lens unit according to claim 1; and
a camera body that includes a body mount including the body claws to be engaged with the bayonet claws of the lens unit.

20. A lens mount comprising:
a reference surface that is in contact with a body mount provided on a camera;
a cylindrical portion that extends to the body mount from the reference surface;
a plurality of bayonet claws that are provided in a circumferential direction of the cylindrical portion and extend outward in a radial direction;
a plurality of bayonet grooves that are defined by the reference surface, the cylindrical portion, and the plurality of bayonet claws and are engaged with body claws of the body mount; and
an elastic member that is provided in at least one bayonet groove of the plurality of bayonet grooves, includes a contact surface to be in contact with the body claw, is provided in a rotational direction of the body claw, and applies a biasing force to the body claw in the radial direction,
wherein the elastic member is a molded member made of rubber of resin;
wherein the contact surface extends in the circumferential direction;
wherein the elastic member includes a stepped portion that is adjacent to the contact surface in parallel, extends in the circumferential direction and is provided in a direction of an optical axis, the stepped portion configured so as not to be brought into contact with the body claw, and
wherein the elastic member includes a rectangular portion having long sides extending in the circumferential direction and short sides extending in the radial direction, the rectangular potion having a hollow portion that passes between the contact surface and an opposite surface of the contact surface in the direction of the optical axis.

21. The lens mount according to claim 20,
wherein the elastic member has a first height outward in the radial direction,
wherein the stepped portion has a uniform second height shorter than the first height outward in the radial direction, and
wherein the stepped portion has a flat surface on a side of the body claw.

22. The lens mount according to claim 20,
wherein the contact surface of the elastic member is not into contact with the the body claw till just before the elastic member reaches a stop posiotion of rotation of the body claw, and is into contact with the body claw at the stop position of the rotation of the body claw.

23. A camera system including a camera body and a lens unit,
wherein the camera body includes a body mount that includes a lock pin and body claws,
wherein the lens unit includes:
an optical sysmte that includes at least one lens;
a lens barrel that receives the optical system; and
a lens mount that is provided on one end side of the lens barrel and is mounted on a body mount provided on a camera,
wherein the lens mount includes:
a reference surface that is in contact with the body mount;
a cylindrical portion that extends to the body mount from the reference surface;
a plurality of bayonet claws that are provided in a circumferential direction of the cylindrical portion and extend outward in a radial direction, a plurality of bayonet grooves that are defined by the reference surface, the cylindrical portion, and the plurality of bayonet claws and are engaged with body claws of the body mount;
an elastic member that is provided in at least one bayonet groove of the plurality of bayonet grooves, includes a contact surface to be in contact with the body claw, is provided in a rotational direction of the body claw, and applies a biasing force to the body claw in the radial direction; and
a pin hole,
wherein the elastic member is a molded member made of rubber of resin,
wherein the contact surface extends in the circumferential direction,
wherein the elastic member includes a stepped portion that is adjacent to the contact surface in parallel, extends in the circumferential direction and is provided in a direction of an optical axis, the stepped portion configured so as not to be brought into contact with the body claw,
wherein the elastic member includes a rectangular portion having long sides extending in the circumferential direction and short sides extending in the radial direction, the rectangular potion having a hollow portion that passes between the contact surface and an opposite surface of the contact surface in the direction of the optical axis,
wherein a stop position of rotation of the body claws is a position where the lock pin is inserted into the pin hole, and
wherein the elastic member is diposed at a position where the elastic member is not into contact with the the body claw till just before the elastic member reaches the stop posiotion of the rotation of the body claw, and is into contact with the body claw at the stop position of rotation of the body claw.

24. A lens unit comprising:
an optical sysmte that includes at least one lens;
a lens barrel that receives the optical system; and
a lens mount that is provided on one end side of the lens barrel and is mounted on a body mount provided on a camera,
wherein the lens mount includes:
a reference surface that is in contact with the body mount;
a cylindrical portion that extends to the body mount from the reference surface;

a plurality of bayonet claws that are provided in a circumferential direction of the cylindrical portion and extend outward in a radial direction, a plurality of bayonet grooves that are defined by the reference surface, the cylindrical portion, and the plurality of bayonet claws and are engaged with body claws of the body mount; and an elastic member that is provided in at least one bayonet groove of the plurality of bayonet grooves, includes a contact surface to be in contact with the body claw, is provided in a rotational direction of the body claw, and applies a biasing force to the body claw in the radial direction, wherein the elastic member is a molded member made of rubber of resin, and wherein the elastic member includes a rectangular portion having long sides extending in the circumferential direction and short sides extending in the radial direction, the rectangular potion having a hollow portion that passes between the contact surface and an opposite surface of the contact surface in the direction of the optical axis.

25. A camera system comprising:

a lens unit according to claim 24; and a camera body including a body mount that has body claws engageable with the bayonet claws of the lens unit.

* * * * *